United States Patent
Qian

(10) Patent No.: US 11,092,881 B2
(45) Date of Patent: Aug. 17, 2021

(54) MOTORIZED TILT AND SWIVEL DEVICE FOR PANORAMA AND VIRTUAL REALITY APPLICATIONS

(71) Applicant: HANGZHOU TARUO INFORMATION TECHNOLOGY CO., LTD., Zhejiang (CN)

(72) Inventor: Hao Qian, Hangzhou (CN)

(73) Assignee: HANGZHOU TARUO INFORMATION TECHNOLOGY CO., LTD, Hangzhou (CN)

( * ) Notice: Subject to any disclaimer, the term of this patent is extended or adjusted under 35 U.S.C. 154(b) by 637 days.

(21) Appl. No.: 16/067,798

(22) PCT Filed: May 5, 2017

(86) PCT No.: PCT/CN2017/083349
§ 371 (c)(1),
(2) Date: Jul. 2, 2018

(87) PCT Pub. No.: WO2018/201496
PCT Pub. Date: Nov. 8, 2018

(65) Prior Publication Data
US 2021/0173287 A1  Jun. 10, 2021

(51) Int. Cl.
*G03B 17/56* (2021.01)
*G03B 37/02* (2021.01)
(Continued)

(52) U.S. Cl.
CPC ........ *G03B 17/561* (2013.01); *F16M 11/126* (2013.01); *F16M 11/18* (2013.01);
(Continued)

(58) Field of Classification Search
CPC .... G03B 17/561; G03B 37/02; F16M 11/126; H04N 5/23299
See application file for complete search history.

(56) References Cited

U.S. PATENT DOCUMENTS

2015/0329062 A1   11/2015   Ackeret et al.
2017/0131622 A1*   5/2017   Zhao ................... G03B 17/561

FOREIGN PATENT DOCUMENTS

WO   2017/041914 A1   3/2017

OTHER PUBLICATIONS

International Search Report issued in PCT/CN2017/083349 dated Jan. 26, 2018 (4 pages).
(Continued)

*Primary Examiner* — Minh Q Phan
(74) *Attorney, Agent, or Firm* — Osha Bergman Watanabe & Burton

(57) ABSTRACT

A motorized tilt and swivel device that includes a motorized component and an alignment component. The motorized component is configured to receive a command signal from a camera mobile device, and place, in response to the command signal, the camera mobile device in multiple positions for capturing images. The positions include multiple rotation angles with respect to a rotating axis and multiple tilting angles with respect to a tilting axis. The alignment component is configured to substantially align, prior to receiving the command signal and based on a alignment marker, the rotating axis with a camera lens of the camera mobile device, substantially align, prior to receiving the command signal and based on the alignment marker, the tilting axis with the camera lens, and constrain the camera mobile device such that the camera lens substantially overlaps an intersection of the rotating axis and the tilting axis in each position.

20 Claims, 15 Drawing Sheets

(51) Int. Cl.
  *F16M 11/18* (2006.01)
  *F16M 11/12* (2006.01)
  *H04N 5/232* (2006.01)

(52) U.S. Cl.
  CPC ....... *G03B 37/02* (2013.01); *F16M 2200/022* (2013.01); *H04N 5/23238* (2013.01); *H04N 5/23299* (2018.08)

(56) References Cited

OTHER PUBLICATIONS

Written Opinion issued in PCT/CN2017/083349 dated Jan. 26, 2018 (4 pages).

\* cited by examiner

MOTORIZED TILT AND SWIVEL DEVICE FOR PANORAMA AND VIRTUAL REALITY APPLICATIONS

BACKGROUND

A camera mobile device is a mobile device with a camera for taking photographs and/or video recordings. A dedicated camera with communication capability is an example of the camera mobile device. A mobile phone with a built-in camera, referred to as a camera phone, is another example of the camera mobile device. Many camera phones have a fixed-focus lens and a smaller sensor than a dedicated camera. A camera phone, such as a smart phone, may have a display with graphical user interface that occupy a large portion (e.g., 70% or larger) of the front surface. The camera lens is typically on the back surface of the camera phone, but may also have an additional camera lens on the front surface.

A panorama is a wide angle representation (e.g., wide angle view) of a physical space in photography or other media. Image stitching or photo stitching is the process of combining multiple photographic images with overlapping fields of view to produce a panorama.

SUMMARY

In general, in one aspect, the invention relates to a motorized tilt and swivel device that includes a motorized component and an alignment component. The motorized component is configured to receive a command signal and place, in response to the command signal, the camera mobile device in multiple positions for capturing images. The positions include multiple rotation angles with respect to a rotating axis and multiple tilting angles with respect to a tilting axis. The alignment component is configured to substantially align, prior to receiving the command signal and based on a alignment marker, the rotating axis with a camera lens of the camera mobile device, substantially align, prior to receiving the command signal and based on the alignment marker, the tilting axis with the camera lens, and constrain the camera mobile device such that the camera lens substantially overlaps an intersection of the rotating axis and the tilting axis in each position.

In general, in one aspect, the invention relates to a method for generating a panorama. The method includes substantially aligning, based on a alignment marker of a motorized tilt and swivel device, a rotating axis of the motorized tilt and swivel device with a camera lens of a camera mobile device, substantially aligning, based on the alignment marker, a tilting axis of the motorized tilt and swivel device with the camera lens, receiving, by the motorized tilt and swivel device, a command signal, placing, by the motorized tilt and swivel device in response to the command signal, the camera mobile device in a number of positions for capturing images of the panorama, and constraining, by the motorized tilt and swivel device, the camera mobile device such that the camera lens substantially overlaps an intersection of the rotating axis and the tilting axis in each of the positions, where the positions include multiple rotation angles with respect to the rotating axis and multiple tilting angles with respect to the tilting axis, where the rotating axis intersects the tilting axis.

In general, in one aspect, the invention relates to a non-transitory computer readable medium storing instructions for receiving, by a motorized tilt and swivel device, a motor command signal and placing, by the motorized tilt and swivel device in response to the motor command signal, a camera mobile device in multiple positions for capturing images of the panorama, where a rotating axis and a tilting axis of the motorized tilt and swivel device are substantially aligned, based on an alignment marker of the motorized tilt and swivel device, with a camera lens of a camera mobile device, where the camera mobile device is constrained, by the motorized tilt and swivel device, such that the camera lens substantially overlaps an intersection of the rotating axis and the tilting axis in each of the multiple positions, where the positions include multiple rotation angles with respect to the rotating axis and multiple tilting angles with respect to the tilting axis, where the rotating axis intersects the tilting axis.

Other aspects of the invention will be apparent from the following description and the appended claims.

DETAILED DESCRIPTION

Figure 1:
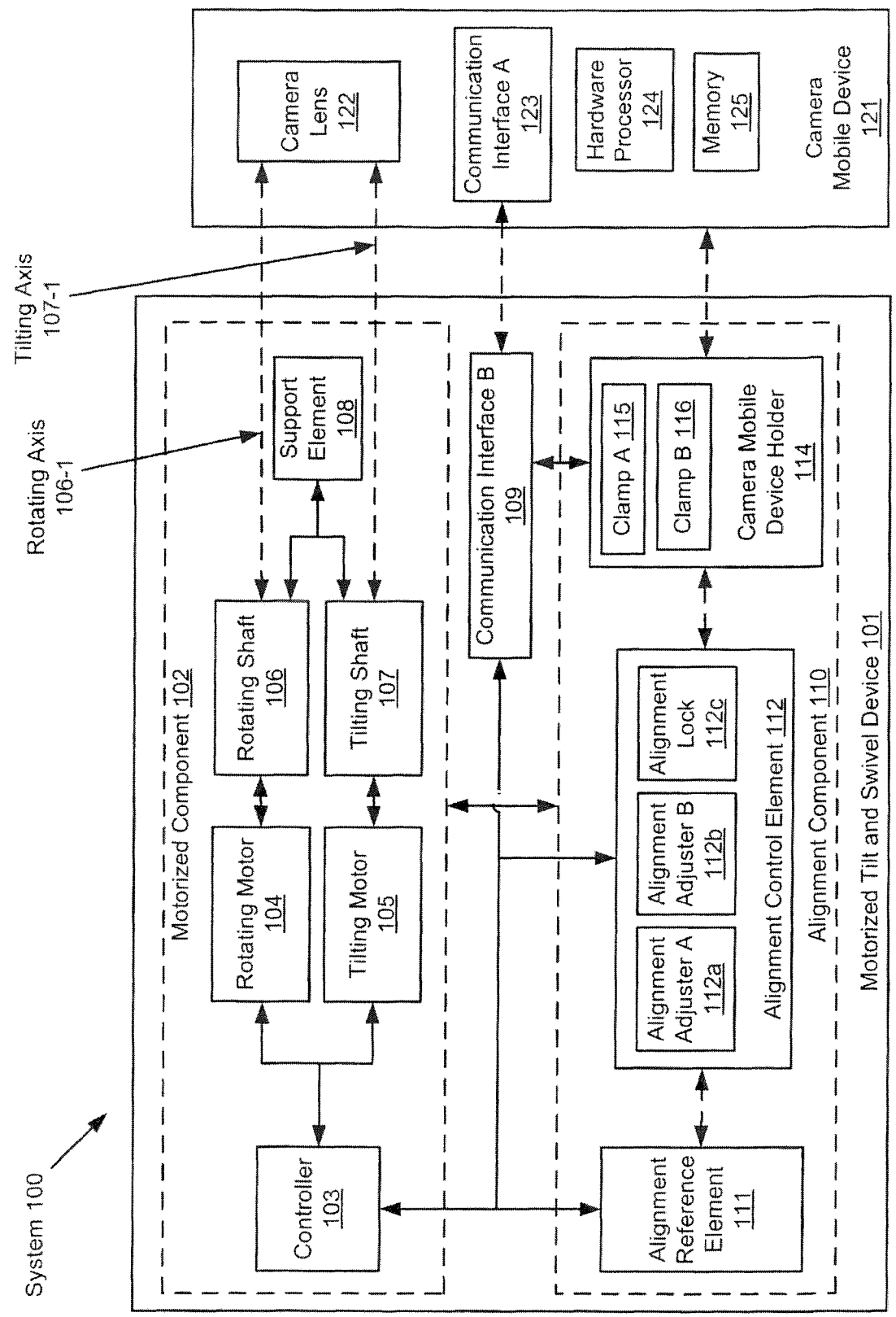
FIG. 1 shows a schematic block diagram of a motorized tilt and swivel device in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for a motorized tilt and swivel device. In particular, the motorized tilt and swivel device is an electro-mechanical assembly that holds or otherwise positions a camera mobile device in a sequence of positions for capturing a collection of images to generate a panorama. In one or more embodiments, the motorized tilt and swivel device is separate from the camera mobile device. Although the camera mobile device may be used without the motorized tilt and swivel device, the image capturing for generating the panorama is automated and improved by using the motorized tilt and swivel device.

In one or more embodiments of the invention, the motorized tilt and swivel device includes a motorized component and an alignment component. The motorized component is configured to place the camera mobile device in the sequence of positions in response to a command signal. In particular, the sequence of positions includes a combination of rotation angles and tilting angles where the rotating axis intersects the tilting axis at the location of a camera lens of the camera mobile device. Further, the alignment component is configured to (i) substantially align, prior to receiving the command signal and based on an alignment marker, the rotating axis with the camera lens, (ii) substantially align, prior to receiving the command signal and based on the alignment marker, the tilting axis with the camera lens, and (iii) constrain the camera mobile device during image capture such that the camera lens substantially overlaps the intersection of the rotating axis and the tilting axis in each of the sequence of positions. As used herein, the term "substantially align" refers to positioning two items within a pre-determined range, such as 1 mm (millimeter), 0.1 mm, etc. For example, the pre-determined range may be defined based on a manufacturing tolerance of related components, reproducibility of manual manipulation of related components, and limitation due to the user's eye sight.

In one or more embodiments, the intersection of the rotating axis and the tilting axis is stationary independent of the rotating/tilting angles of the motorized tilt and swivel device. Once substantially aligned to the intersection point, the location of the camera lens remains substantially stationary while capturing the collection of images throughout various rotating/tilting angles of the motorized tilt and swivel device. Accordingly, the images are stitched together with reduced distortion to improve the quality of the panorama.

FIG. 1 shows a system (100) in accordance with one or more embodiments. In one or more embodiments, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes the motorized tilt and swivel device (101) and the camera mobile device (121). As noted above, the camera mobile device (121) is a mobile device with a built-in camera having a camera lens (122). In addition, the camera mobile device (121) includes a hardware processor (124) and associated memory (125), as well as a communication interface A (123), such as a Bluetooth interface, a near field communication (NFC) interface, a USB interface, or other wireless/wired communication interfaces. In one or more embodiments, the memory (125) is configured to store instructions that, when executed, cause the hardware processor (124) to perform image capturing functionalities using the camera lens (122) and to perform additional functionalities of the camera mobile device (121). In one or more embodiments, the camera mobile device (121) performs the image capturing functionalities using the camera lens (122) according to the method flowcharts described in reference to FIGS. 10A and/or 10B below. In one or more embodiments, the memory (125) stores instructions to perform one or more portions of the method flowcharts described in reference to FIGS. 10A and/or 10B below. In one or more embodiments, the instructions to perform one or more portions of the method flowchart described in reference to FIGS. 10A and/or 10B are part of a mobile application, or mobile app, which is a user-installable software application designed to run on a smartphone or other mobile devices. In one or more embodiments, the camera mobile device (121) is based on the computing system described in reference to FIG. 15 below. In one or more embodiments, the camera mobile device (121) is physically separate from the motorized camera mobile device stand (101) and may be used without the motorized camera mobile device stand (101).

Figure 2:
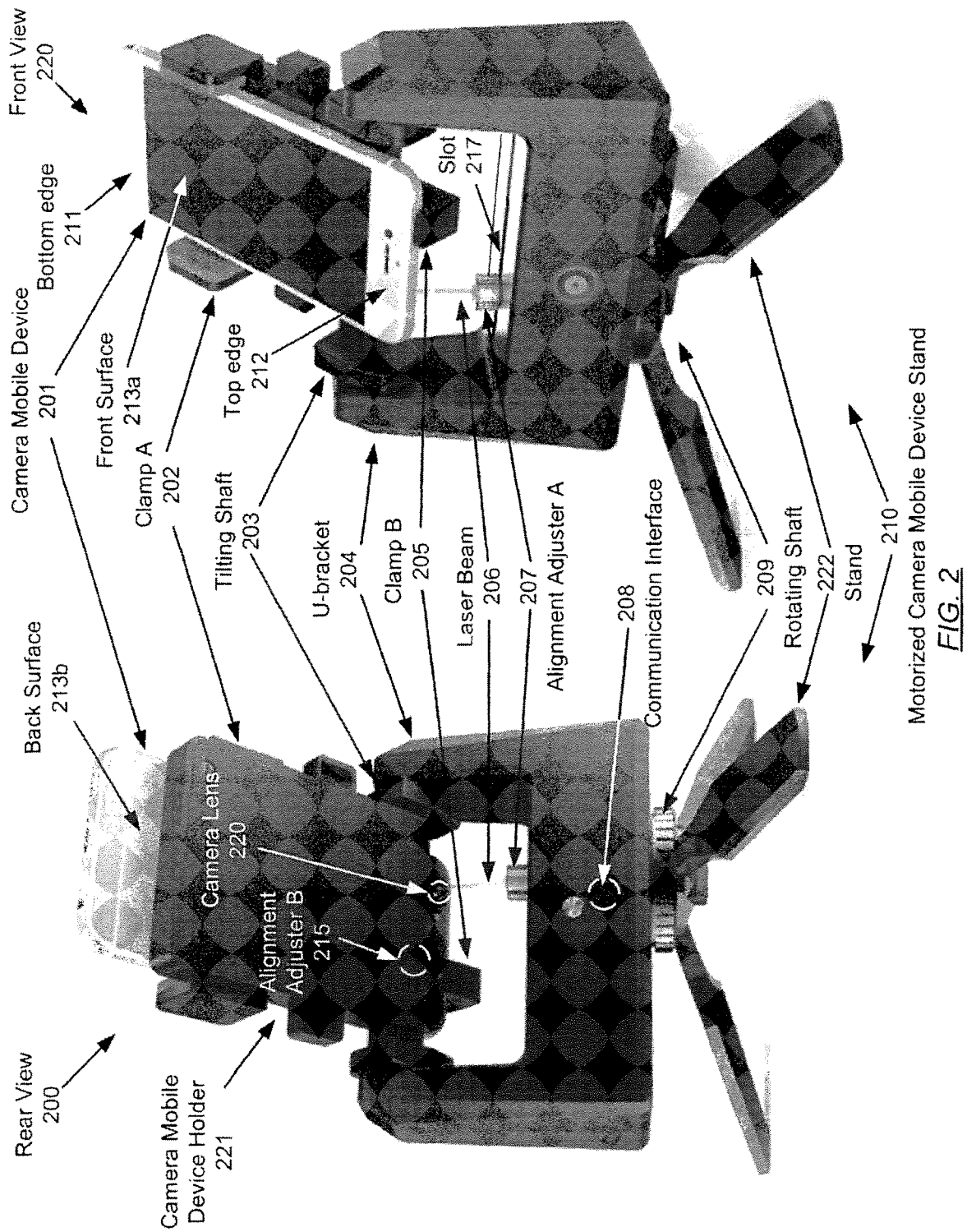
FIGS. 2 and 3 show various views of a motorized camera mobile device stand in accordance with one or more embodiments of the invention.
Figure 3:
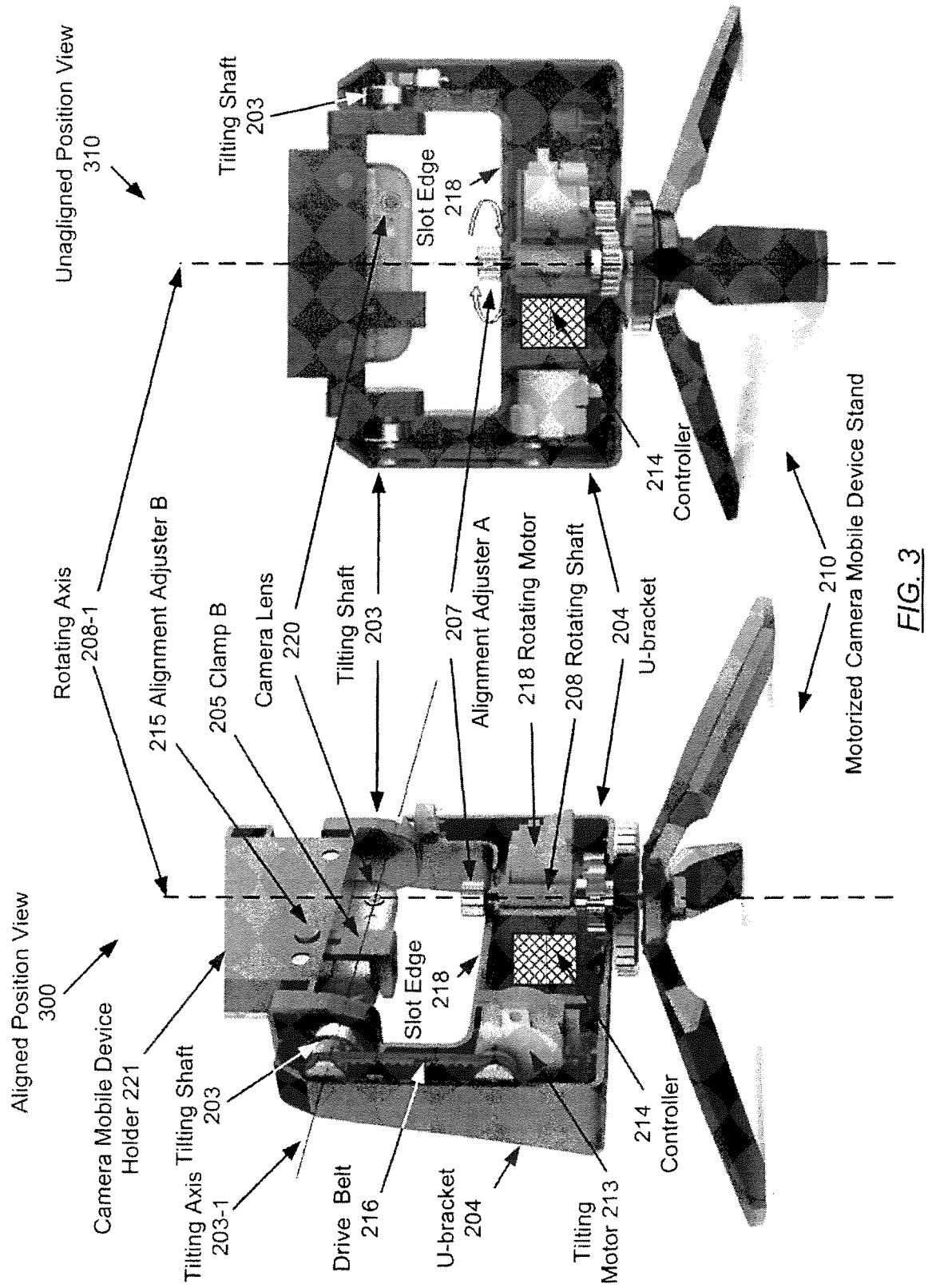

In one or more embodiments of the invention, the motorized tilt and swivel device (101) is an electro-mechanical assembly that includes a motorized component (102), an alignment component (110), and a communication interface B (109). The motorized component (102) includes a controller (103), a rotating motor (104) coupled to a rotating shaft (106), a tilting motor (105) coupled to a tiling shaft (107), and a support element (108) that encloses or otherwise mechanically supports one or more of the controller (103), rotating motor (104), rotating shaft (106), tilting motor (105), and tiling shaft (107). In one or more embodiments, the rotating shaft (106) is rotatable by the rotating motor (104) around a rotating axis (106-1). Similarly, the tilting shaft (107) is rotatable by the tilting motor (105) around a tilting axis (107-1). An example of the rotating shaft (106), rotating motor (104), rotating axis (106-1), tilting shaft (107), tilting motor (105), tilting axis (107-1), and communication interface B (109) is depicted in FIGS. 2 and 3 below. Another example of the rotating shaft (106), rotating motor (104), rotating axis (106-1), tilting shaft (107), tilting motor (105), tilting axis (107-1), and communication interface B (109) is depicted in FIGS. 4-9 below.

In one or more embodiments, the controller (103) includes a hardware component, a software component, or a combination thereof. The controller (103) is configured to control the rotating motor (104) and tilting motor (107) in response to a motor command signal. In one or more embodiments, the controller (103) receives the motor command signal from an operating button (not shown), in response to a user activation, on the motorized tilt and swivel device (101). In one or more embodiments, the controller (103) receives the motor command signal from the camera mobile device (121) via the communication interface B (109). For example, the communication interface B (109) may include a hardware component, a software component, or a combination thereof. The communication interface B (109) may use a communication protocol (e.g., based on Bluetooth, NFC, USB, or other wireless/wired communication interfaces) compatible with the communication interface A (123) to receive various command signals, such as the motor command signal and an alignment command signal described below. In one or more embodiments, the controller (103) activates, in response to the motor command signal, the rotating motor (104) to rotate the rotating shaft (106) through a number of rotation angles. In one or more embodiments, the controller (103) activates, in response to the motor command signal, the tilting motor (105) to rotate the tilting shaft (107) through a number of tilting angles. The combination of the rotation angles and the tilting angles positions the camera mobile device holder (114) (described below) in a sequence of positions. When the camera mobile device (121) is placed in the camera mobile device holder (114), the sequence of positions allow the camera mobile device (121) to capture a collection of images that are stitched into a panorama with reduced distortion. In one or more embodiments, one or more of the rotating motor (104) and tilting motor (107) is a stepping motor. In such embodiments, the motor command signal includes a value of the rotation angle and/or tilting angle for each of the sequence of positions where the stepping motor is driven by the value to reach each individual position. An example of the sequence of positions for panorama image capture is depicted in FIGS. 11, 12, 13, and 14 below. In one or more embodiments, the controller (103) performs its functionalities using the method described in reference to FIGS. 10A and/or 10B below. In one or more embodiments, the controller (103) includes a computer processor and a non-transitory computer readable medium (e.g., computer memory). In particular, the non-transitory computer readable medium stores instructions o perform one or more portions of the method described in reference to FIGS. 10A and/or 10B below. For example, the instructions stored in the computer memory of the controller (103) may be referred to as embedded software.

In one or more embodiments, the alignment component (110) includes an alignment reference element (111), an alignment control element (112), and a camera mobile device holder (114). In one or more embodiments, the alignment component (110) is configured to (i) substantially align, prior to the controller (103) receiving the motor command signal and based on a alignment marker, the rotating axis and the tilting axis with a camera lens of the camera mobile device and (ii) constrain the camera mobile device such that the camera lens substantially overlaps an intersection of the rotating axis and the tilting axis in each of the sequence of positions for capturing images to generate a panorama. Each of the elements of the alignment component (110) is described in detail below.

In one or more embodiments, the alignment component (110) performs the alignment process by causing the tilting motor (105) and tilting shaft (107) to slide with respect to the rotating motor (104) and rotating shaft (106). In such embodiments, the tilting motor (105) and tilting shaft (107) are moveably coupled to the rotating motor (104) and rotating shaft (106) via the support element (108). Such embodiments are referred to as moveably-coupled embodiments. In the moveably-coupled embodiments, the support element (108) may have a U-shaped form and is referred to as a U-bracket support element (108). An example of the moveably-coupled embodiments is described in reference to FIGS. 2 and 3 below, by way of a motorized camera mobile device stand. In other words, the motorized camera mobile device stand depicted in FIGS. 2 and 3 below is an example of the motorized tilt and swivel device (101).

In one or more embodiments, the alignment component (110) performs the alignment process without any sliding motion between the tilting motor (105) or tilting shaft (107) with respect to the rotating motor (104) or rotating shaft (106). In such embodiments, the tilting motor (105) and tilting shaft (107) are directly coupled to the rotating motor (104) and rotating shaft (106). Accordingly, the tilting motor (105), tilting shaft (107), rotating motor (104), and rotating shaft (106) are collectively supported by the support element (108). Such embodiments are referred to as direct-coupled embodiments. An example of the direct-coupled embodiments is described in reference to FIGS. 4-9 below.

The alignment component (110) of the moveably-coupled embodiments is described below. In one or more of the moveably-coupled embodiments, the alignment reference element (111) includes an alignment laser and is referred to as the alignment laser reference element (111). Further, the alignment control element (112) includes an alignment adjuster A (112a) and an alignment adjuster B (112b) where the alignment lock (112c) is omitted. In one or more embodiments, the alignment laser reference element (111) is mechanically coupled to the rotating motor (104) and configured to generate a laser beam. For example, the laser beam may be manually turned on or off by a user. In another example, the laser beam may be turned on or off in response to an alignment command signal received from the camera mobile device (121), via the communication interface B (109). Specifically, the laser beam propagates along the rotating axis (106-1) and intersects the tilting axis (107-1). In one or more embodiments, the alignment adjuster A (112a) is configured to substantially align, based on the laser beam, the rotating axis (106-1) with the camera lens (122). Further, the alignment adjuster B (112b) is configured to substantially align, based on the laser beam, the tilting axis (107-1) with the camera lens (122). In one or more embodiments, when the camera mobile device (121) is placed in the aforementioned camera mobile device holder (114), the rotating axis (106-1) and the tilting axis (107-1) are aligned with the camera lens (122) by positioning the U-bracket support element (108) and the camera mobile device (121) in respective aligned positions. In one or more embodiments, the intersection of the rotating axis (106-1) and the tilting axis (107-1) is stationary independent of the rotating/tilting angles of the motorized tilt and swivel device (101). Once substantially aligned to the intersection point, the location of the camera lens (122) remains substantially stationary independent of the rotating/tilting angles of the motorized tilt and swivel device (101).

In one or more of the moveably-coupled embodiments, the alignment adjuster A (112a) is configured to slide the U-bracket support element (108) into an aligned position of the U-bracket support element (108). Further, the alignment adjuster B (112b) is configured to slide the camera mobile device (121) into an aligned position of the camera mobile device (121). Specifically, the alignment adjuster A (112a) slides, with respect to the rotating axis (106-1), the U-bracket support element (108) along the tilting axis (107-1) into the aligned position. In other words, the alignment adjuster A (112a) moves the U-bracket support element (108) along a direction parallel to the tilting axis (107-1) and in a back-and-forth motion with respect to the rotating axis (106-1) until the aligned position of the U-bracket support element (108) is reached. Further, when the camera mobile device (121) is placed in the aforementioned camera mobile device holder (114), the alignment adjuster B (112b) is configured to slide, with respect to the tilting axis (107-1), the camera mobile device (121) along the rotating axis (106-1) into the aligned position. In other words, the alignment adjuster B (112b) moves the camera mobile device (121) along a direction parallel to the rotating axis (106-1) and in a back-and-forth motion with respect to the tilting axis (107-1) until the aligned position of the camera mobile device (121) is reached.

In one or more of the moveably-coupled embodiments, the alignment adjuster A (112a) and alignment adjuster B (112b) cooperatively slide the U-bracket support element (108) and the camera mobile device (121) into the respective aligned positions in response to mechanical manipulations by a user. In such embodiments, the user visually determines that the respective alignment positions are reached by both the U-bracket support element (108) and the camera mobile device (121). In one or more embodiments, the alignment adjuster A (112a) and alignment adjuster B (112b) cooperatively slide the U-bracket support element (108) and the camera mobile device (121) into the respective aligned positions in response to the alignment command signal from the camera mobile device (121). In such embodiments, the camera mobile device (121) uses the camera lens (122) to detect the laser beam for determining that the respective alignment positions are reached by both the U-bracket support element (108) and the camera mobile device (121). Once the respective alignment positions of the U-bracket support element (108) and the camera mobile device (121) are reached, the alignment adjuster A (112a) and alignment adjuster B (112b) may hold the U-bracket support element (108) and the camera mobile device (121) in the respective aligned positions and maintain the laser beam to substantially align with the camera lens (122).

In one or more of the moveably-coupled embodiments, the camera mobile device holder (114) includes a clamp A (115) and a clamp B (116) that are collectively configured to hold the camera mobile device (121) in each of the aforementioned sequence of positions. In one or more embodiments, the alignment adjuster B (112b) is configured to unlock one or more clamps to slide, with respect to the tilting axis (107-1), the camera mobile device (121) along the rotating axis (106-1) into the aligned position of the camera mobile device (121). In one or more embodiments, the alignment adjuster B (112b) unlocks one or more clamps, to slide the camera mobile device (121) into the aligned position, in response to mechanical manipulations by a user. In one or more embodiments, the alignment adjuster B (112b) unlocks one or more clamps, to slide the camera mobile device (121) into the aligned position, in response to the alignment command signal from the camera mobile device (121).

An example of aligning the rotating axis (106-1) and the tilting axis (107-1) with the camera lens (122) by positioning the U-bracket support element (108) and the camera mobile device (121) in respective aligned positions is depicted in FIG. 3 below.

FIG. 2 shows a moveably-coupled embodiment of the system (100) depicted in FIG. 1 above. Specifically, FIG. 2 shows a rear view (200) and a front view (220) of an example of the system (100). In particular, the motorized camera mobile device stand (210) shown in the rear view (200) and front vide (220) is an example of the motorized tilt and swivel device (101) depicted in FIG. 1 above. In one or more embodiments, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the rear view (200) and front view (220) show the camera mobile device (201) placed in the camera mobile device holder (221) of the motorized camera mobile device stand (210). In particular, the camera mobile device (201), camera mobile device holder (221), and motorized camera mobile device stand (210) correspond to and are examples of the camera mobile device (121), camera mobile device holder (114), and motorized tilt and swivel device (101) depicted in FIG. 1 above. Further as shown in FIG. 2, the clamp A (202), tilting shaft (203), U-bracket (204), clamp B (205), alignment adjuster A (207), communication interface (208), rotating shaft (208), camera lens (220), and alignment adjuster B (215) correspond to and are examples of the clamp A (115), tilting shaft (107), U-bracket support element (108), clamp B (116), alignment adjuster A (112a), communication interface B (109), rotating shaft (106), camera lens (122), and alignment adjuster B (112b) depicted in FIG. 1 above. In addition, the laser beam (206) is generated by an alignment laser (not shown) that corresponds to the alignment laser reference element (111) depicted in FIG. 1 above.

In one or more embodiments, the U-bracket (204) is coupled with and rotatable by the rotating shaft (208) for placing the camera mobile device holder (221) in a number of rotation angles. In one or more embodiments, the U-bracket (204) is coupled with the camera mobile device holder (221) via the tilting shaft (203) where the camera mobile device holder (221) is tiltable by the tilting shaft (203) for placing the camera mobile device holder (221) in a number of tilting angles. In one or more embodiments, the motorized camera mobile device stand (210) includes a stand (222) to maintain the motorized camera mobile device stand (210) at a user-selected location for generating the panorama.

In the example shown in FIG. 2, the camera mobile device (201) is a smart phone in a rectangular shape having a front surface (213a), back surface (213b), top edge (212), and bottom edge (211). Specifically, the back surface (213b) is one surface of the smart phone where the camera lens (220) is located. The front surface (213a) is another surface opposite to the back surface (213b). The top edge (212) is one shorter edge of the rectangular shape nearest to the camera lens (220). The bottom edge (211) is another shorter edge of the rectangular shape opposite to the top edge (212). As shown in FIG. 2, the camera mobile device (201) is placed in the camera mobile device holder (221) with the top edge (212) closer to the tilting shaft (203) than the bottom edge (211). In other words, the bottom edge (211) traverses a circumference of an arc while the top edge (212) remains near the center of the arc as the tilting shaft (203) tilts the camera mobile device holder (221) through various tilting angles. In particular, the camera mobile device (201) is locked or otherwise constrained in the camera mobile device holder (221) by the clamp A (202) and clamp B (205). For example, the camera mobile device (201) remains secured in the camera mobile device holder (221) while being rotated and/or tilted through various rotation/tilting angles.

FIG. 3 shows an aligned position view (300) and an unaligned position view (310) of the example of the system (100) as depicted in FIG. 2 above. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

In addition to the components described in reference to FIG. 2 above, FIG. 3 shows the rotating axis (208-1), rotating motor (218), controller (214), tilting axis (203-1), and tilting motor (213a) that correspond to and are examples of the rotating axis (106-1), rotating motor (104), controller (103), tilting axis (107), and tilting motor (105) depicted in FIG. 1 above. Further, the rotating motor (218) is shown to couple to the rotating shaft (208) via mechanical gears where the center line of the rotating shaft (208) defines the rotating axis (208-1). Similarly, the tilting motor (213a) is shown to couple to the tilting shaft (203) via a drive belt (216) where the center line of the tilting shaft (203) defines the tilting axis (203-1).

In one or more embodiments, the U-bracket (204) encloses or otherwise mechanically supports the controller (214), rotating motor (218), rotating shaft (208), tilting motor (213a), and tiling shaft (203). In the example shown in FIG. 3, the U-bracket (204) is coupled with and rotatable by the rotating shaft (208) for placing the camera mobile device holder (221) in various rotation angles. For example, rotation through various rotation angles is represented by two circular arrows surrounding the rotating axis (208-1) in the unaligned position view (310). Further, the U-bracket (204) is coupled with the camera mobile device holder (221) via the tilting shaft (203) where the camera mobile device holder (221) is tiltable by the tilting shaft (203) for placing the camera mobile device holder (221) in various tilting angles. For example, the tilting angle may be defined as the angle between the back surface (213b) of the camera mobile device (201) and a horizontal surface (not shown) where the motorized camera mobile device stand (210) is placed.

In one or more embodiments, an alignment laser (not shown in FIG. 3) is mechanically coupled to the rotating motor (218) and generates a laser beam (not shown in FIG. 3) that propagates along the rotating axis (208-1) and intersects the tilting axis (203-1). In other words, the laser beam marks the path of the rotating axis (208-1) and renders the rotating axis (208-1) visible to a user. Further, the laser beam may be sensed by the camera lens (220) to generate an electronic confirmation of alignment when the rotating axis (208-1) intersects the camera lens (220). In one or more embodiments, the U-bracket (204) is coupled with the rotating shaft (208) via the alignment adjuster A (207). For example, the alignment adjuster A (207) may be manipulated (e.g., turned around the rotating axis (208-1)) by a user to slide the U-bracket (204) along the slot edge (218) until the camera lens (220) is as close to the rotating axis (208-1) as possible. In other words, the user may manipulate the alignment adjuster A (207) until the camera lens (220) is visibly as close to the laser beam as possible. In particular, the slot edge (218) corresponds to the slot (217) shown in FIG. 2 above.

In one or more embodiments, with the camera mobile device (201) placed in the camera mobile device holder (221), the alignment adjuster B (112b) is configured to unlock the clamp B (205) in response to a physical push action of a user. Accordingly, the user may slide the camera mobile device (201), with respect to the tilting axis (203-1), along the rotating axis (208-1) into the aligned position. In other words, the user may move the camera mobile device (121) along a direction parallel to the rotating axis (208-1) and in a back-and-forth motion with respect to the tilting axis (203-1) until the camera lens (220) is visibly as close to the laser beam as possible. By the user successively sliding the U-bracket (204) back-and-forth along the slot edge (218) and sliding the camera mobile device (201) back-and-forth along the rotating axis (208-1), the camera lens (220) may be positioned as close as possible to the intersection point where the rotating axis (208-1) intersects the tilting axis (203-1). For example, the camera lens (220) may be positioned within 1 mm (milli-meter), 2 mm, or other predetermined range from the intersection point. The predetermined range may be dependent on a diameter of the laser beam, a diameter of the camera lens (220), a tolerance of fabricating the motorized mobile device stand (210), etc. When the camera lens (220) is positioned within the predetermined range, the camera lens (220) is said to be substantially aligned to the rotating axis (208-1) and the tilting axis (203-1). Once substantially aligned to the rotating axis (208-1) and the tilting axis (203-1), the location of the camera lens (220) remains substantially stationary independent of rotating/tilting angles of the motorized camera mobile device stand (210).

In one or more embodiments, the alignment adjuster A (207) may slide the U-bracket (204) along the slot edge (218) in response to an alignment command signal from the camera mobile device (201). Further, the alignment adjuster B (112b) may unlock the clamp B (205) and slide the camera mobile device (121) into the aligned position in response to the alignment command signal. Further, the laser beam may be turned on in response to the alignment command signal to confirm that the automatic alignment is successful. In one or more embodiments, the camera mobile device (201) establishes a communication link with the motorized camera mobile device stand (210) upon the camera mobile device (201) detecting that the motorized camera mobile device stand (210) is in proximity, i.e., within a detectable range based on the communication protocol used by the communication interface (208). In response to the detecting, the alignment command signal may be sent from the camera mobile device (201) to initiate an automatic alignment procedure.

Figure 5:
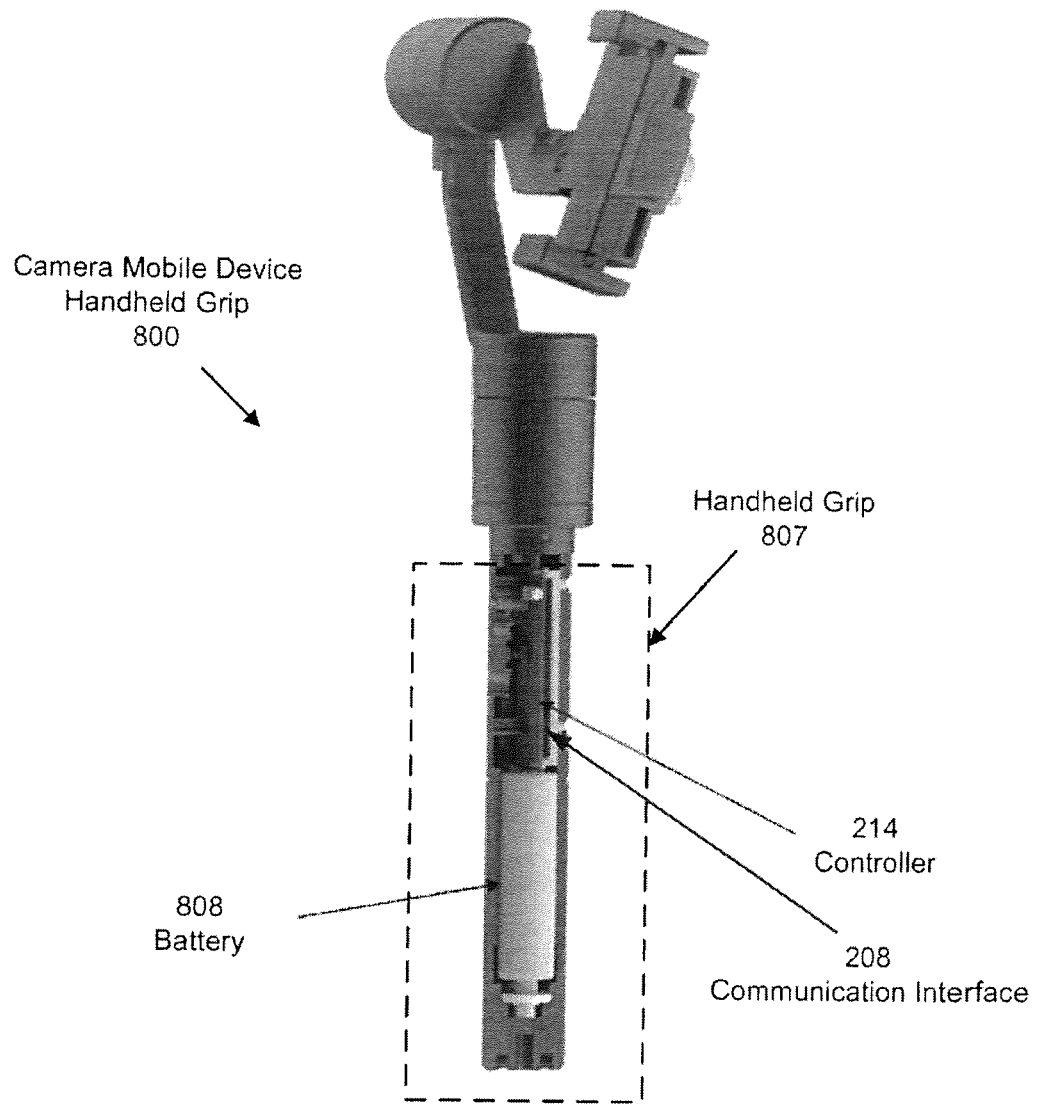
Figure 6:
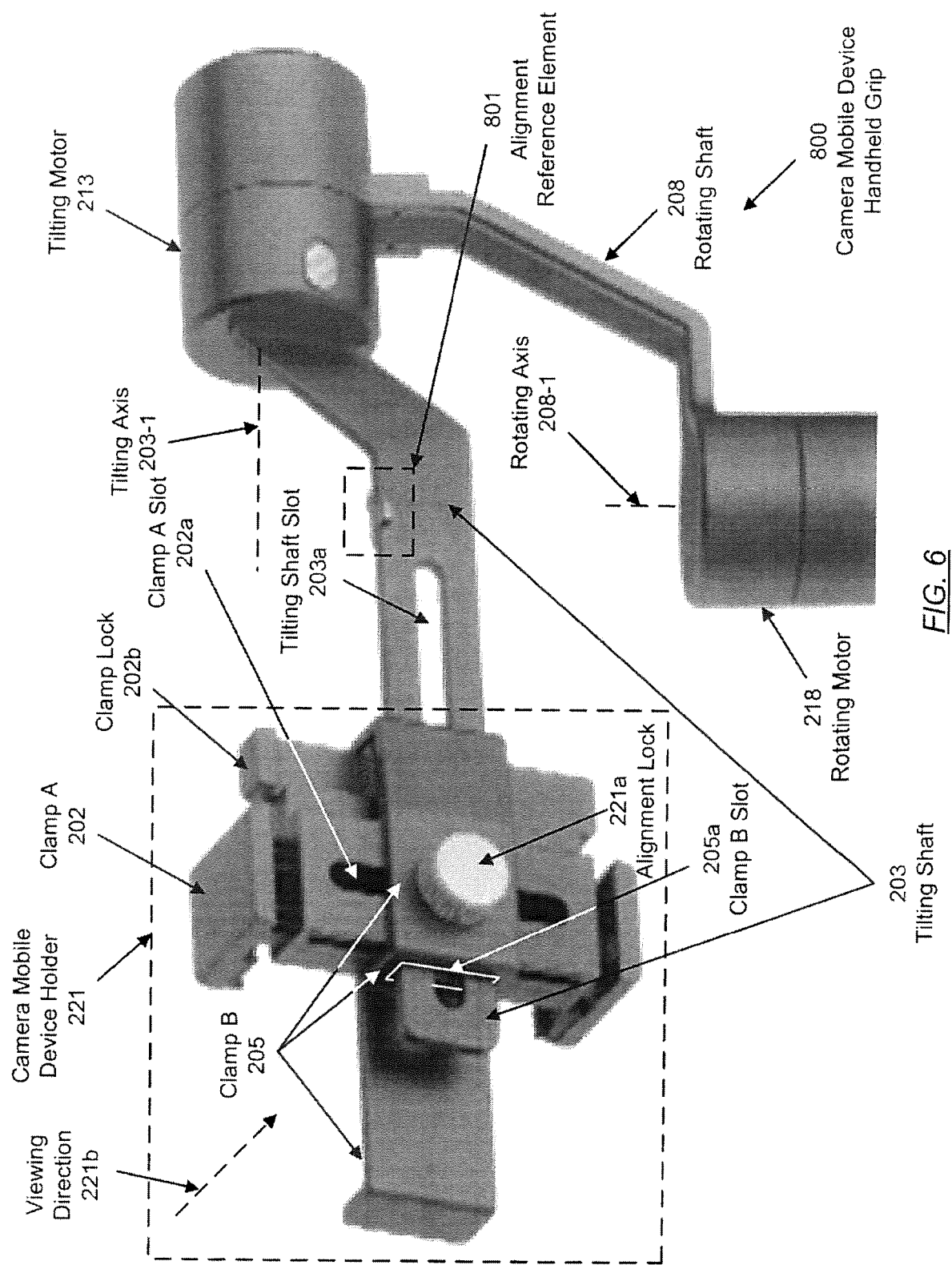

In one or more embodiments, subsequent to the manual or automatic alignment procedure described above, the controller (214) activates, in response to a motor command signal from the camera mobile device (201), the rotating motor (218) to rotate the rotating shaft (208) through a number of rotation angles. In one or more embodiments, the controller (214) activates, in response to the motor command signal, the tilting motor (213a) to rotate the tilting shaft (203) through a number of tilting angles. The combination of the rotation angles and the tiling angles positions the camera mobile device holder (221) in a sequence of positions. When the camera mobile device (201) is placed in the camera mobile device holder (221), the sequence of positions allow the camera mobile device (201) to capture a collection of images that are stitched into a panorama with reduced distortion. In one or more embodiments, in response to the rotating shaft (208) reaching each of the rotation angles and the tilting shaft (203) reaching each of the tilting angles, the motorized camera mobile device stand (210) communicates with the camera mobile device (201) to synchronize the image capturing and the positions of the camera mobile device. For example, when reaching and stabilizing at each individual position, the motorized camera mobile device stand (210) may send a ready signal to trigger the camera mobile device (201) to capture an image. An example of the sequence of positions for panorama image capture is depicted in FIGS. 5 and 6 below.

In one or more embodiments, one or more of the automatic features described in reference to FIG. 3 above (e.g., proximity detection, automatic alignment, image capture synchronization, etc.) are performed by software programs installed on the motorized camera mobile device stand and/or the camera mobile device. For example, the motorized camera mobile device stand may include embedded software (e.g., firmware) and the camera mobile device may be installed a mobile application software commonly referred to as "mobile app".

Although embodiments of the motorized camera mobile device stand are described with a free-standing configuration in FIGS. 2 and 3 above, one or more embodiments may include a hand-held configuration. For example, the stand (222) depicted in FIGS. 2 and 3 may be substituted with a hand-held handle that the user may hold stationary to capture the sequence of images of a panorama. Although the removably-coupled embodiments of the motorized tilt and swivel device is described as the motorized camera mobile device stand with an alignment laser in FIGS. 2 and 3 above, one or more embodiments may substitute the alignment laser with a mechanical alignment marker that emulates the laser beam. The mechanical alignment marker may be retracted after the alignment process to avoid interfering with the tilting and/or rotation of the camera mobile device holder.

Returning to further discussion of the alignment component (110) depicted in FIG. 1 above, in one or more of the direct-coupled embodiments, the alignment reference element (111) includes a mechanical marker and is referred to as the alignment marker reference element (111). Further, the alignment control element (112) includes the alignment lock (112c) where the alignment adjuster A (112a) and alignment adjuster B (112b) are integrated with the clamp A (115) and clamp B (116), respectively. FIGS. 4-9 shows various views of a motorized tilt and swivel device in the direct-coupled embodiments.

Figure 4:
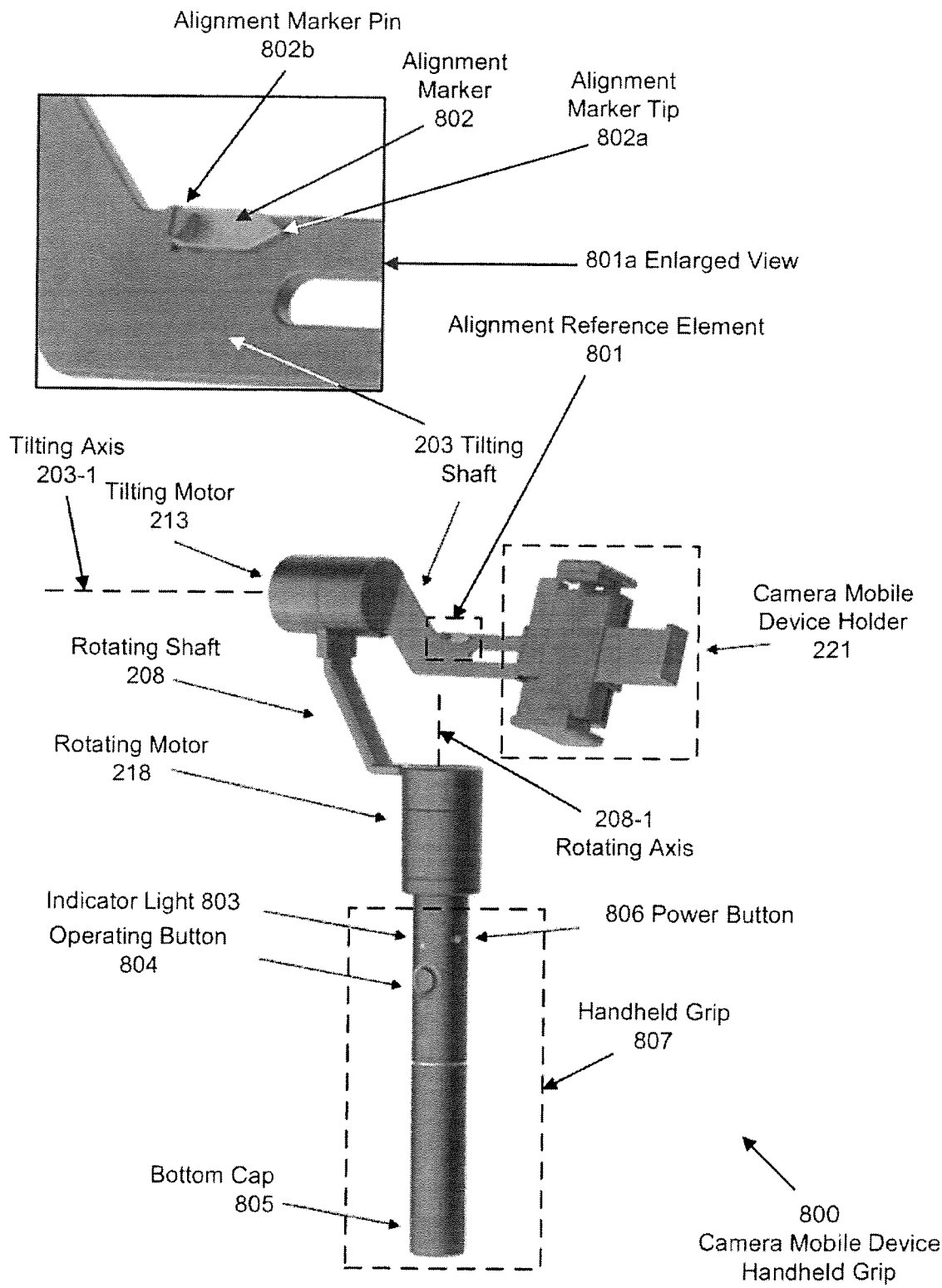
FIGS. 4, 5, 6, 7, 8, and 9 show various views of a motorized tilt and swivel device in accordance with one or more embodiments of the invention.

In particular, FIG. 4 shows a direct-coupled embodiment of the system (100) depicted in FIG. 1 above. In other words, the camera mobile device handheld grip (800) shown in FIG. 4 is an example of the motorized tilt and swivel device (101) depicted in FIG. 1 above. In one or more embodiments, one or more of the modules and elements shown in FIG. 4 may be omitted, repeated, and/or substituted. Accordingly, embodiments of the invention should not be considered limited to the specific arrangements of modules shown in FIG. 4.

As shown in FIG. 4, the camera mobile device handheld grip (800) includes the camera mobile device holder (221), tilting shaft (203), tilting motor (213), tilting axis (203-1), rotating shaft (208), rotating motor (218), rotating axis (208-1), alignment reference element (801), and handheld grip (807). In one or more embodiments, the camera mobile device holder (221), tilting shaft (203), tilting motor (213), rotating shaft (208), rotating motor (218), alignment reference element (801), and handheld grip (807) correspond to and are examples of the camera mobile device holder (114), tilting shaft (107), tilting motor (105), tilting axis (107-1), rotating shaft (106), rotating motor (104), rotating axis (106-1), alignment reference element (111), and support element (108) depicted in FIG. 1 above. Corresponding to the discussion in reference to FIG. 1 above, in one or more embodiments, the rotating shaft (208) is rotatable by the rotating motor (218) around a rotating axis (208-1). Similarly, the tilting shaft (203) is rotatable by the tilting motor (213) around a tilting axis (203-1). In particular, the tilting motor (203) and tilting shaft (213) are directly coupled to the rotating motor (218) and rotating shaft (208) without any sliding motion there-between.

Figure 8:
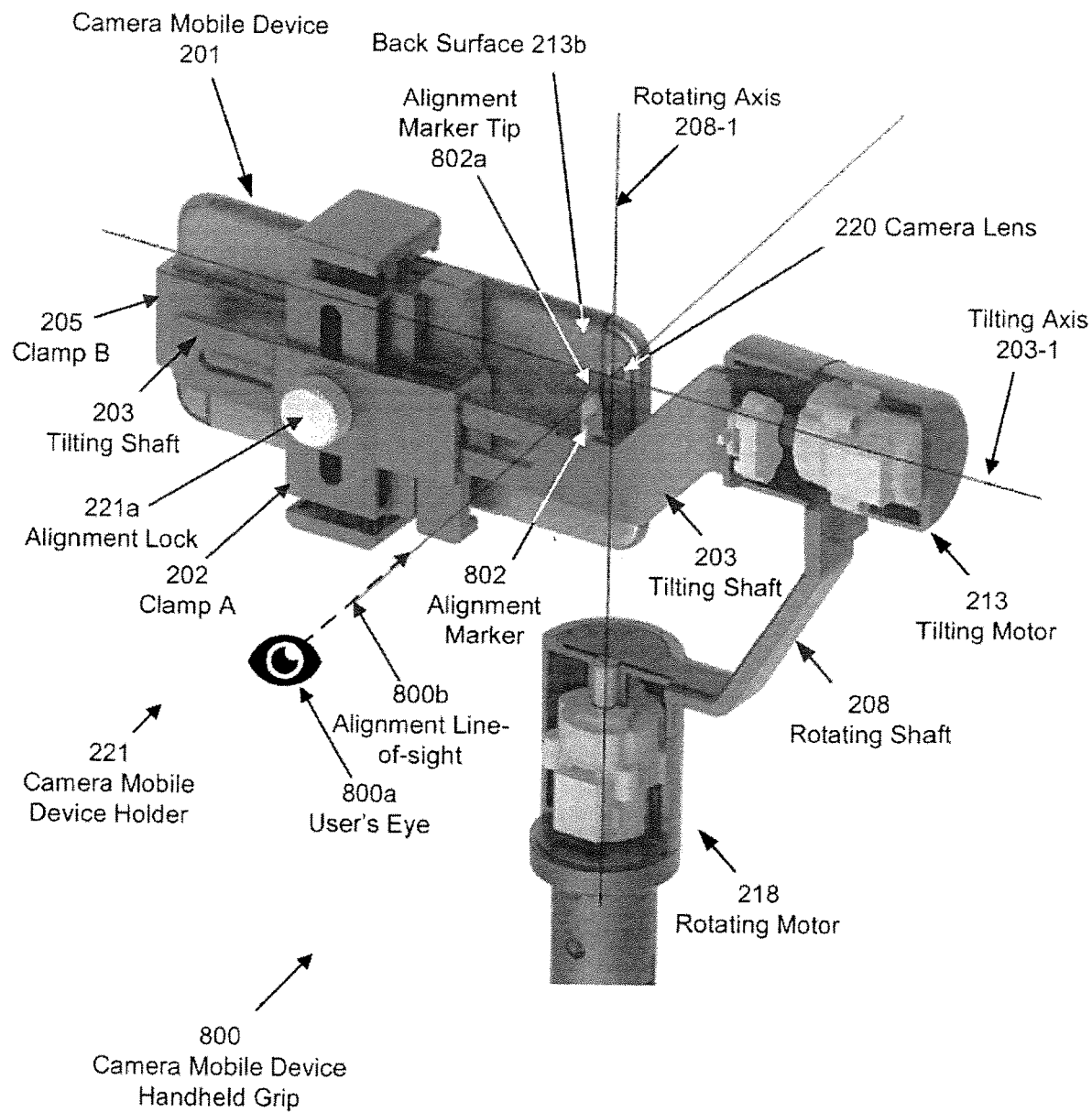
Figure 9:
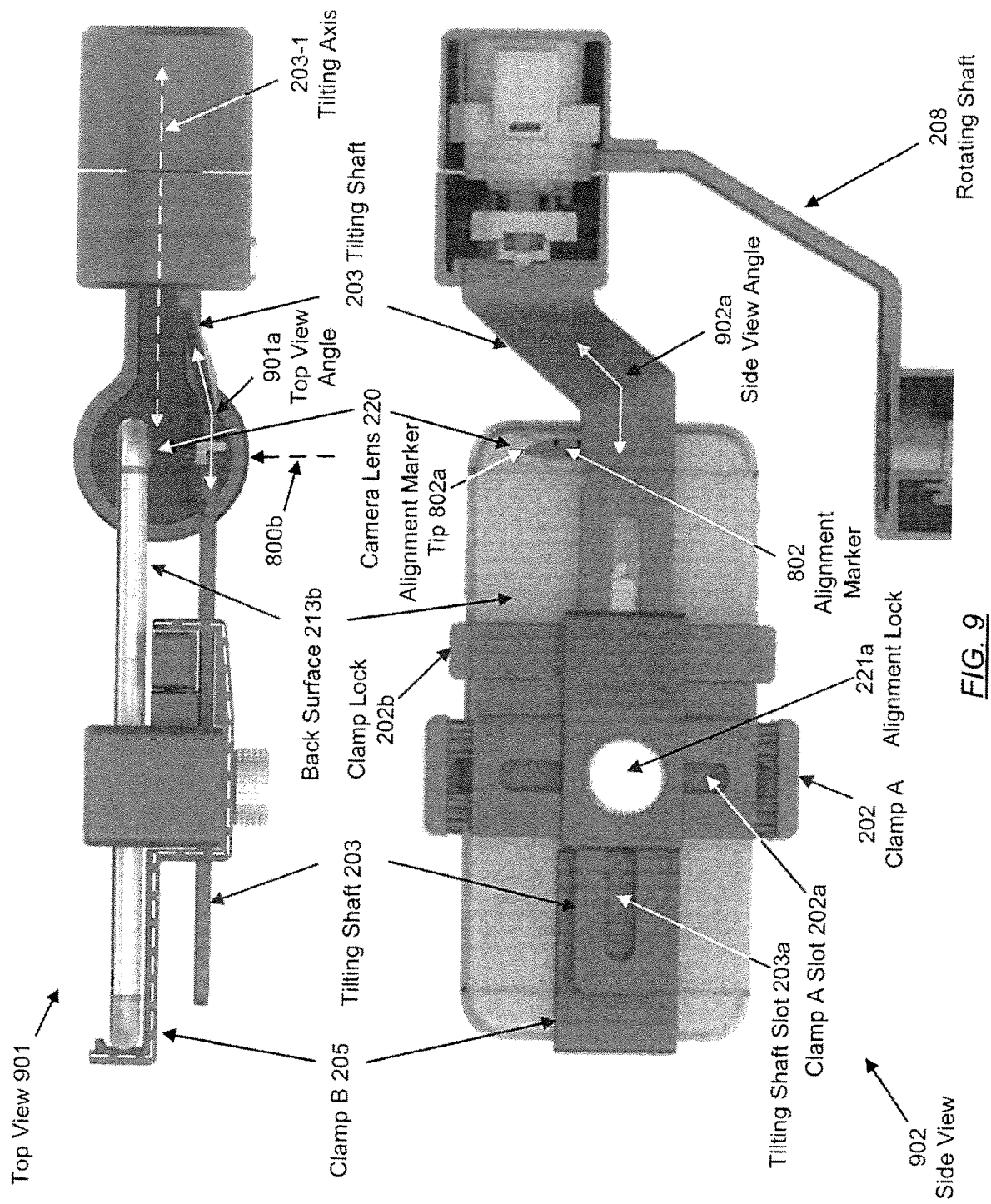

The alignment reference element (801) is shown in the enlarged view (801a) in more details. In particular, alignment reference element (801) includes an alignment marker (802) having a wedge-shaped alignment marker tip (802a) and rotatably coupled to the tilting shaft (203) via an alignment marker pin (802b). The alignment marker (802) is depicted in the enlarged view (801a) in a retracted position hidden by the tilting shaft (203). In contrast, the alignment marker (802) is depicted in FIGS. 8 and 9 below in an exposed position. As will become clear from the description in reference to FIGS. 8 and 9 below, the alignment marker (802) is configured to (i) visibly mark, in the exposed position, the intersection of the rotating axis and tilting axis, and (ii) hide, in the retracted position, from a field of view of the camera lens. In one or more embodiments, the alignment marker (802) is rotatable around the alignment marker pin (802b) and is switchable, in response to a user activation, between the exposed position and the retracted position.

Further as shown in FIG. 4, the handheld grip (807) includes an indicator light (803), operating button (804), bottom cap (805), and power button (806). Additional details inside the handheld grip (807) are shown in FIG. 5, such as the controller (214) and battery (808) that are retained by the bottom cap (805). The controller (214) may include a communication interface (208). Accordingly, the handheld grip (807) may be held in a user's hand during image capture with the indicator light (803), operating button (804), and power button (806) readily accessible by the user. In one or more embodiments, the controller (214) and communication interface (208) correspond to and are examples of the controller (103) and communication interface B (109) depicted in FIG. 1 above. In one or more embodiments, the power button (806) is configured to cause the battery (808) to supply power to the controller (214) for performing various functions of the controller (214). In one or more embodiments, when activated by a user, the operating button (804) is configured to generate and send a command signal to the controller (103). In one or more embodiments, the indicator light (803) is configured to display light patterns to convey status information of the controller (103). Additional details of the camera mobile device holder (221) are described in reference to FIG. 6 below.

As shown in FIG. 6, the camera mobile device holder (221) is moveably coupled to the tilting shaft (203) and configured to hold the camera mobile device (not shown) in each of the sequence of positions for image capture. In particular, the alignment reference element (801) is shown with the alignment marker (802) in the retracted position hidden by the tilting shaft (203). In contrast, an alternative view of the alignment reference element (801) with the alignment marker (802) in the exposed position is depicted in FIG. 8 below.

In one or more embodiments, the camera mobile device holder (221) includes a clamp A (202) having a clamp A slot (202a) and clamp lock (202b), clamp B (205) having a clamp B slot (205a), and alignment lock (221a) penetrating the clamp A slot (202a), clamp B slot (205a), and a tilting shaft slot (203a) of the tilting shaft (203). The clamp A (202), clamp B (205), and alignment lock (221a) correspond to and are examples of the clamp A (115), clamp B (116), and alignment lock (112c) depicted in FIG. 1 above.

Although the penetrating portion of the alignment lock (221a) that penetrates the clamp A slot (202a), clamp B slot (205a), and tilting shaft slot (203a) is obscured by the clamp A (202), clamp B (205), and tilting shaft (203) and is not explicitly shown, the penetrating portion of the alignment lock (221*a*) may be constructed as a pin, a rod, or based on other suitable form factors. In one or more embodiments, the penetrating portion of the alignment lock (221*a*) is suitably sized so as to freely slide, when unlocked, within the clamp A slot (202*a*) and/or the tilting shaft slot (203*a*). Further, the clamp B slot (205*a*) is suitably sized so as to allow the clamp B (205) to freely slide, when unlocked, along the tilting shaft (203). Accordingly, the combination of the clamp A (202) and clamp B (205), when unlocked, is free to slide with respect to the alignment lock (221*a*) within the clamp A slot (202*a*) and/or the tilting shaft slot (203*a*). For example, the combination of the clamp A (202) and clamp B (205), when unlocked, may slid in response to user activation. In other words, the user may handhold the clamp A (202) and/or clamp B (205) to slide within the clamp A slot (202*a*) and/or the tilting shaft slot (203*a*). In one or more embodiments, the tilting shaft slot (203*a*) is coplanar with and parallel to the tilting axis (203-1) to facilitate the alignment process. In one or more embodiments, the tilting shaft (203) may be rotated to a position such that the clamp A slot (202*a*) is coplanar with and parallel to the rotating axis (208-1) to facilitate the alignment process.

In one or more embodiments, the visible portion of the alignment lock (221*a*) is configured to lock (i.e., prevent sliding motion) and unlock (i.e., allow sliding motion) the combination of the clamp A (202) and clamp B (205). For example, the alignment lock (221*a*) may have a threaded pin so as to be turned by a user's fingers to tighten (i.e., for locking) or loosen (i.e., for unlocking) the combination of the clamp A (202) and clamp B (205) against the tilting shaft (203). In another example, the alignment lock (221*a*) may be spring loaded so as to be pushed/pulled by a user's fingers to tighten (i.e., for locking) or loosen (i.e., for unlocking) the combination of the clamp A (202) and clamp B (205) against the tilting shaft (203). Additional details of the clamp A and clamp B (205) viewed along the viewing direction (221*b*) are depicted FIG. 7 below.

Figure 7:
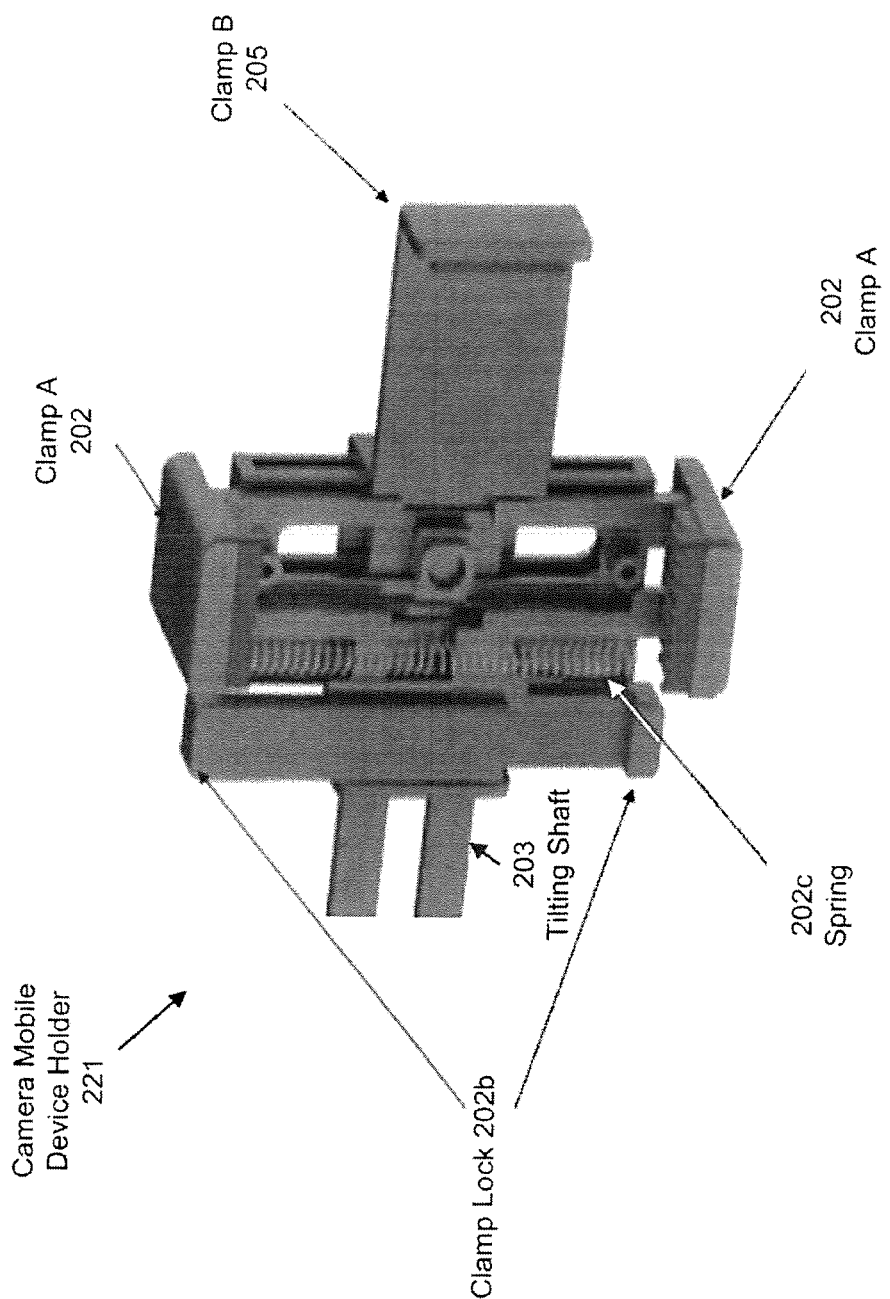

A shown in FIG. 7, the camera mobile device holder (221) further includes a spring (202*c*) that is compressed or released by way of the clamp lock (202*b*). When the clamp lock (202*b*) compresses the spring (202*c*), the opposite ends of the clamp A (202) on the two opposite sides of the tilting shaft (203) are free to be pulled apart by the user to load the camera mobile device (not shown) into the camera mobile device holder (221). In contrast, when the clamp lock (202*b*) releases the spring (202*c*), the opposite ends of the clamp A (202) are pulled together by the spring (202*c*) to hold the camera mobile device (not shown) in place.

FIG. 8 shows an alternative view of the alignment reference element (801) with the alignment marker (802) in the exposed position. In particular, the camera mobile device (201) is held in place by the clamp A (202) and clamp B (205). Specifically, the camera mobile device (201) corresponds to and is an example of the camera mobile device (121) depicted in FIG. 1 above. Further, the tilting shaft (203) is rotated to the position where the back surface (213*b*) of the camera mobile device (201) is substantially coplanar with and parallel to the rotating axis (208-1) and tilting axis (203-1) to facilitate the alignment process. Accordingly, the alignment lock (221*a*) may be unlocked by the user to allow the combination of the camera mobile device (201), clamp A (202), and clamp B (205) to slide along the rotating axis (208-1) with respect to the tilting axis (203-1), and to slide along the tilting axis (203-1) with respect to the rotating axis (208-1). While sliding the combination of the camera mobile device (201), clamp A (202), and clamp B (205), the alignment between the alignment marker tip (802*a*) and the camera lens (220) is continuously evaluated by the user's eye (800*a*) along the alignment line-of-sight (800*b*). When the alignment marker tip (802*a*) and the camera lens (220) are substantially aligned as viewed along the alignment line-of-sight (800*b*), the user may tighten the alignment lock (221*a*) to secure the camera lens (220) in an aligned position. After securing the camera lens (220) in the aligned position and before the image capture starts, the alignment marker (802) may be advantageously switched from the exposed position to the retracted position so as to be hidden from the field of view of the camera lens (220) without interfering with the image capture.

FIG. 9 shows a top view (901) and a side view (902) of the camera mobile device handheld grip (800) depicted in FIG. 8 above. In particular, the top view (901) shows an outline of the clamp B (205) as a sequence of white dash line segments that are connected along various angles. Further, the top view (901) shows a non-flat top view angle (901*a*) of the tilting shaft (203) that is configured to place the camera lens (220) and the back surface (213*b*) of the camera mobile device to be coplanar with the tilting axis (203-1). In addition, the alignment marker (802) is attached to the tilting shaft (203) at a suitable position to visibly mark the intersection of the rotating axis (208-1) and tilting axis (203-1). As used herein, the term "visibly mark" refers to projecting the alignment marker tip (802*a*) along the alignment line-of-sight (800*b*) onto the physical intersection point of the rotating axis (208-1) and tilting axis (203-1).

The side view (902) shows a non-flat side view angle (902*a*) of the tilting shaft (203) that is configured to place the camera mobile device holder within a pre-determined range of the tilting axis (203-1). In particular, the pre-determined range is selected to allow the camera lens (220) to be within the length of the clamp A slot (202*a*) from the alignment marker tip (802*a*) in the exposed position.

In one or more embodiments, one or more of the automatic features described in reference to FIGS. 8 and 9 above (e.g., proximity detection, facilitating alignment, image capture synchronization, etc.) are performed by software programs installed on the motorized tilt and swivel device and/or the camera mobile device. For example, the motorized tilt and swivel device may include embedded software (e.g., firmware) and the camera mobile device may be installed a mobile application software commonly referred to as "mobile app".

Although embodiments of the motorized tilt and swivel device are described with a handheld configuration in FIGS. 4-9 above, one or more embodiments may include a free-standing configuration. For example, the handheld grip (807) depicted in FIGS. 4 and 5 may be substituted with a free-standing stand or an attachment mechanism to attach to a separate free-standing structure. Although the direct-coupled embodiments of the motorized tilt and swivel device is described with an alignment marker in FIGS. 4, 8, and 9 above, one or more embodiments may substitute the alignment marker with a pair of alignment lasers that trace the tilting axis and the rotating axis to visibly mark the intersection thereof. The alignment lasers may be turned off after the alignment process to avoid interfering with field of view of the camera lens.

Figure 10A:
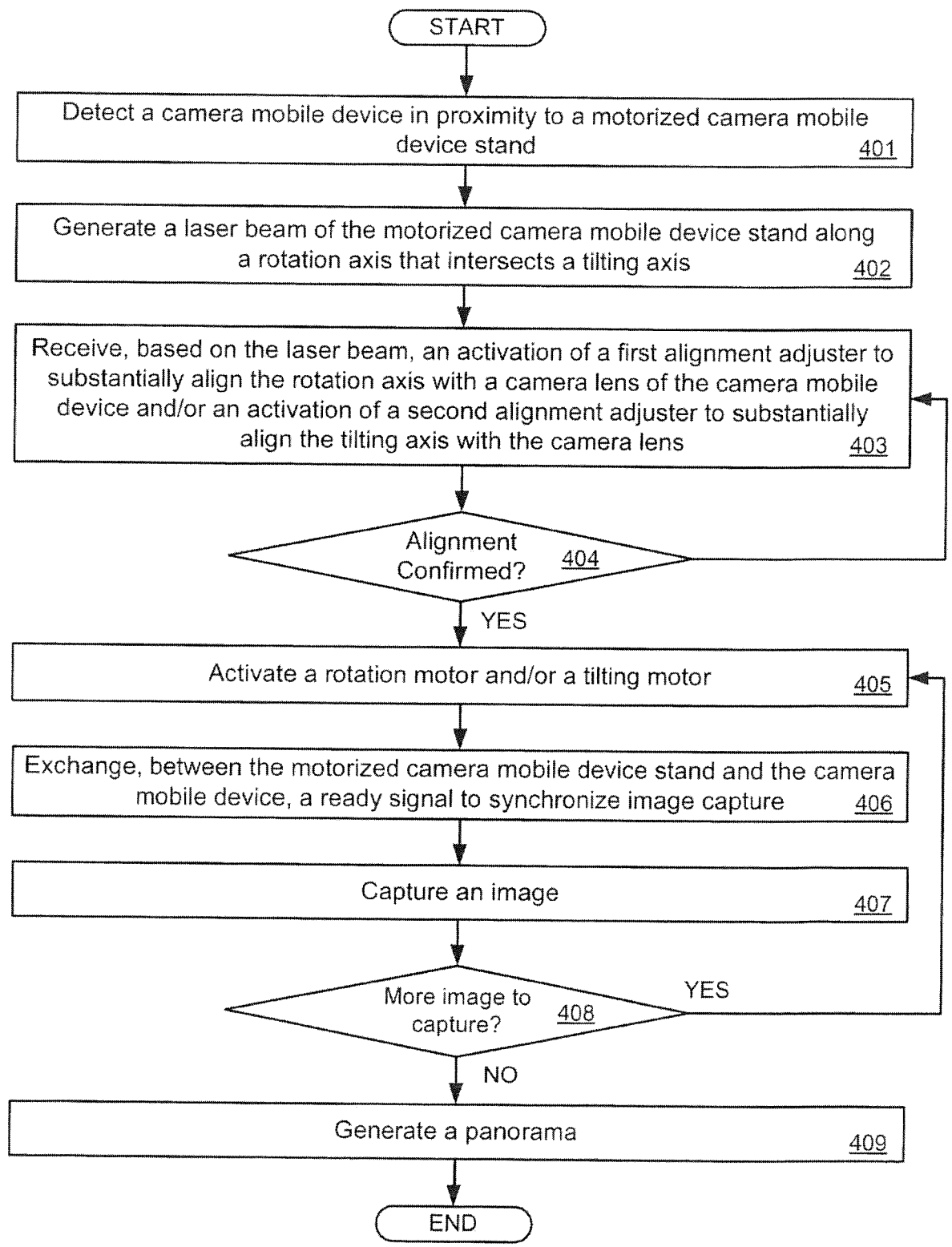
FIGS. 10A and 10B show method flowcharts in accordance with one or more embodiments of the invention.

FIG. 10A shows a flowchart in accordance with one or more embodiments. The process shown in FIG. 10A may be executed, for example, by one or more components discussed above in reference to FIGS. 1-3. One or more steps shown in FIG. 10A may be omitted, repeated, and/or performed in a different order among different embodiments of the invention. Accordingly, embodiments of the invention should not be considered limited to the specific number and arrangement of steps shown in FIG. 10A.

Initially, in Step 401, proximity between a motorized camera mobile device stand and a camera mobile device is detected. In one or more embodiments, the detection is made by a user placing the camera mobile device onto the motorized camera mobile device stand. In one or more embodiments, the detection is made based on detection signals exchanged between communication interfaces of the motorized camera mobile device stand and the camera mobile device. In one or more embodiments, the communication interfaces are controlled by software programs installed on the motorized camera mobile device stand and the camera mobile device to perform the detection.

In Step 402, in response to detecting the proximity, a laser beam of the motorized camera mobile device stand is initiated. In one or more embodiments, the laser beam is generated by an alignment laser coupled to a rotating motor of the motorized camera mobile device stand. In particular, the laser beam propagates along the rotating axis and intersects a tilting axis of the motorized camera mobile device stand. In one or more embodiments, the alignment laser is turned on by a user. In one or more embodiments, the alignment laser is automatically turned on in response to the motorized camera mobile device stand detecting the proximity of the camera mobile device.

In Step 403, based on the laser beam, an activation of a first alignment adjuster and/or an activation of a second alignment adjuster is received. In one or more embodiments, the activation of the first alignment adjuster is received to substantially align the rotating axis with a camera lens of the camera mobile device. Further, the activation of the second alignment adjuster is received to substantially align the tilting axis with the camera lens. In one or more embodiments, the activation is by a user manually manipulating the first alignment adjuster and/or the second alignment adjuster. In one or more embodiments, the first alignment adjuster and/or the second alignment adjuster is automatically activated by an alignment command signal from the camera mobile device. During alignment, the camera mobile device is placed in a camera mobile device holder that is coupled, via a tilting shaft, to a U-bracket of the motorized camera mobile device stand.

In one or more embodiments, the activation of the first alignment adjuster causes the U-bracket to slide along the tilting axis. In particular, the U-bracket slides with respect to the rotating axis such that the camera lens moves toward the rotating axis.

In one or more embodiments, the activation of the second alignment adjuster unlocks a clamp on the camera mobile device holder to allow the camera mobile device to slide along the rotating axis. In particular, the camera mobile device slides in the camera mobile device holder with respect to the tilting axis such that the camera lens moves toward the tilting axis.

In Step 404, a determination is made as to whether the alignment is confirmed. If the determination is negative, i.e., the camera lens is not yet substantially aligned to the rotating axis and the tilting axis, the method returns to Step 403. If the determination is positive, i.e., the camera lens is substantially aligned to the rotating axis and the tilting axis, the method proceeds to Step 405.

In one or more embodiments, the alignment confirmation is determined by a user visually verifying the laser beam overlapping or otherwise impinging on the camera lens. In one or more embodiments, the alignment confirmation is automatically determined based on the camera lens senses the laser beam when the laser beam overlapping or otherwise impinging on the camera lens.

Once substantially aligned, the U-bracket is held in an aligned position of the U-bracket. Further, the clamp is locked to hold the camera mobile device in an aligned position of the camera mobile device.

In Step 405, a rotating motor and/or a tilting motor is activated to place the camera mobile device in one of a sequence of positions for capturing an image of a panorama. In particular, each individual position corresponds to a combination of a rotation angle of the rotating motor and a tilting angle of the tilting motor. In one or more embodiments, the rotating motor rotates the U-bracket via the rotating shaft to a particular rotation angle. Further, the tilting motor tilts the mobile device holder via the tilting shaft to a particular tilting angle. Accordingly, the camera mobile device is placed in one of the sequence of positions with the camera lens pointing to a corresponding direction. While being rotated by the rotating motor and/or tilted by the tilting motor, the camera mobile device is constrained by the motorized camera mobile device stand such that the camera lens substantially overlaps an intersection of the rotating axis and the tilting axis throughout the rotating and/or tilting action.

In one or more embodiments, the rotating motor and/or tilting motor is activated by a user. In one or more embodiments, the rotating motor and/or tilting motor is automatically activated in response to a command signal from the camera mobile device.

In Step 406, a ready signal is exchanged between the motorized camera mobile device stand and the camera mobile device to synchronize image capture. In one or more embodiments, the motorized camera mobile device stand sends the ready signal to the camera mobile device to trigger the image capture. For example, the ready signal may be sent when the rotating shaft and/or the titling shaft reach the particular rotating angle and/or tilting angle. In one or more embodiments, the ready signal specifies the particular rotating angle and/or tilting angle reached by the rotating shaft and/or the titling shaft. In one or more embodiments, the camera mobile device sends the ready signal to the motorized camera mobile device stand to advance to next position. For example, the ready signal may be sent when the image capture is complete at the current position. In one or more embodiments, the ready signal specifies the next rotating angle and/or next tilting angle to be reached by the rotating shaft and/or the titling shaft.

In Step 407, an image is captured using the camera lens of the camera mobile device. In one or more embodiments, the image is one in a sequence of images to generate a panorama. In one or more embodiments, the image is indexed with the particular rotation angle and tilting angle of the position where the camera mobile device captures the particular image.

In Step 408, a determination is made as to whether any more image remains to be captured. If the determination is positive, i.e., at least one more image remains to be captured, the method returns to Step 405. If the determination is negative, i.e., no more image remains to be captured, the method proceeds to Step 409.

In Step 409, a panorama is generated by stitching together the sequence of images captured through the iterations of Step 405 through Step 408. In one or more embodiments, the panorama is generated by the camera mobile device according to the rotation angle and tilting angle of each of the sequence of images. As noted above, the camera lens remains substantially overlapping the intersection of the rotating axis and the tilting axis throughout the sequence of images captured through the iterations of Step 405 through Step 408. Because the intersection of the rotating axis and the tilting axis is stationary independent of the rotating/tilting angles, the sequence of images are stitched together with reduced distortion to improve the quality of the panorama.

In one or more embodiments, a series of panoramas are generated at a series of time points and processed to generate a media file for virtual reality application.

Figure 10B:
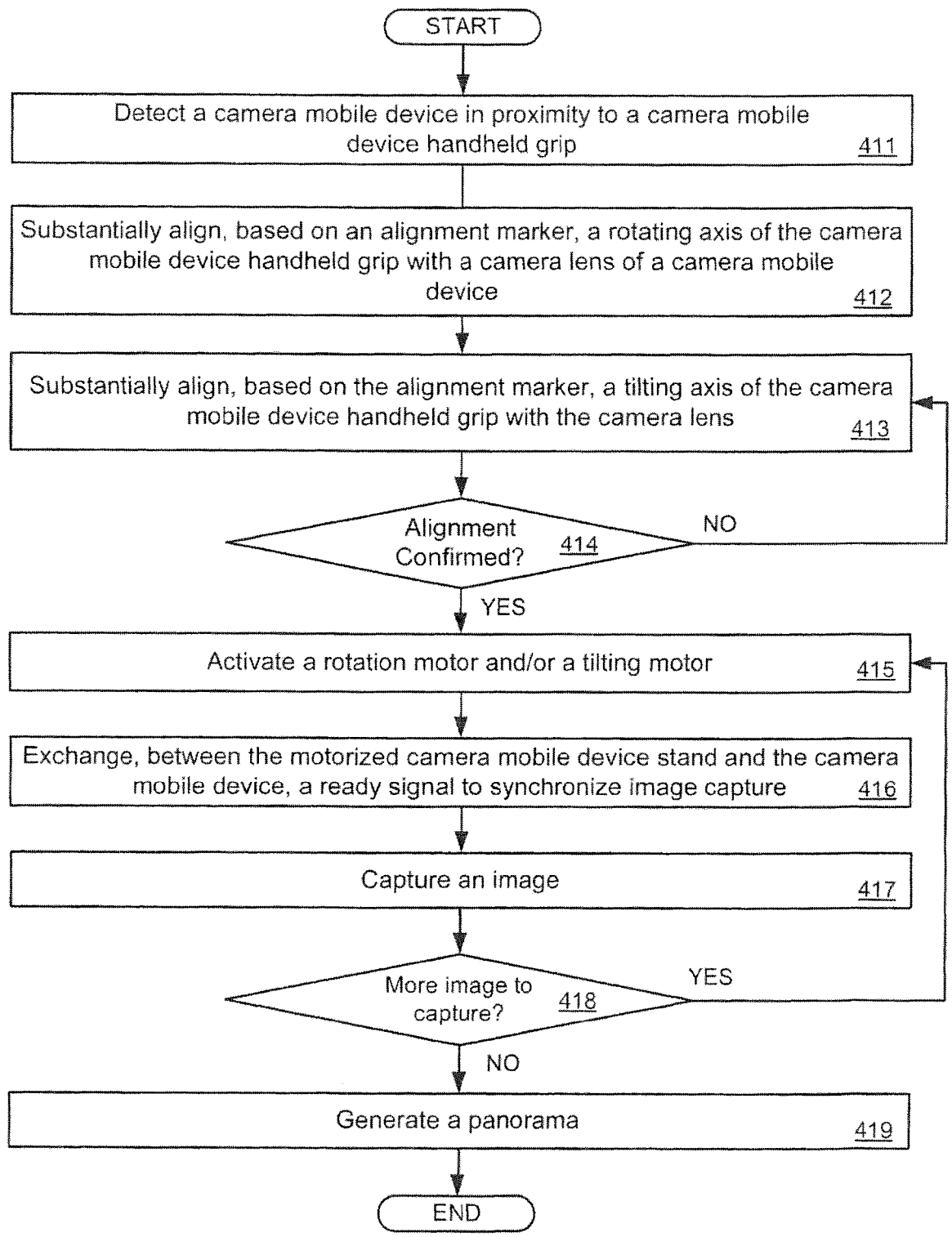

FIG. 10B shows a flowchart in accordance with one or more embodiments. The process shown in FIG. 10B may be executed, for example, by one or more components discussed above in reference to FIGS. 1 and 4-9. One or more steps shown in FIG. 10B may be omitted, repeated, and/or performed in a different order among different embodiments of the invention. Accordingly, embodiments of the invention should not be considered limited to the specific number and arrangement of steps shown in FIG. 10B.

Initially, in Step 411, proximity between a camera mobile device handheld grip and a camera mobile device is detected. In one or more embodiments, the detection is made by a user placing the camera mobile device onto the camera mobile device handheld grip. In one or more embodiments, the detection is made based on detection signals exchanged between communication interfaces of the camera mobile device handheld grip and the camera mobile device. In one or more embodiments, the communication interfaces are controlled by software programs installed on the camera mobile device handheld grip and the camera mobile device to perform the detection. In one or more embodiments, the camera mobile device handheld grip is placed into an alignment mode in response to the detection. For example, an alignment marker may be automatically switched from a retracted position into an exposed position. In another example, a mobile camera device holder may be rotated by a tilting motor to be coplanar with a rotating axis of the camera mobile device handheld grip.

In Step 412, based on an alignment marker, a rotating axis of the camera mobile device handheld grip is substantially aligned with a camera lens of the camera mobile. In particular, an alignment lock is loosened to allow the camera mobile device holder to freely slide along the tilting axis with respect to the rotating axis.

In Step 413, based on an alignment marker, a tilting axis of the camera mobile device handheld grip is substantially aligned with the camera lens of the camera mobile. In particular, an alignment lock is loosened to allow the camera mobile device holder to freely slide along the rotating axis with respect to the tilting axis.

In Step 414, a determination is made as to whether the alignment is confirmed. If the determination is negative, i.e., the camera lens is not yet substantially aligned to the rotating axis and the tilting axis, the method returns to Step 403. If the determination is positive, i.e., the camera lens is substantially aligned to the rotating axis and the tilting axis, the method proceeds to Step 415.

In one or more embodiments, the alignment confirmation is determined by a user visually verifying the alignment marker tip overlapping the camera lens when viewed along an alignment line-of-sight. Once substantially aligned, the camera mobile device holder is held in an aligned position and locked using an alignment lock.

In Step 415, a rotating motor and/or a tilting motor is activated to place the camera mobile device in one of a sequence of positions for capturing an image of a panorama. In particular, each individual position corresponds to a combination of a rotation angle of the rotating motor and a tilting angle of the tilting motor. In one or more embodiments, the rotating motor rotates the camera mobile device holder via the rotating shaft to a particular rotation angle. Further, the tilting motor tilts the mobile device holder via the tilting shaft to a particular tilting angle. Accordingly, the camera mobile device is placed in one of the sequence of positions with the camera lens pointing to a corresponding direction. While being rotated by the rotating motor and/or tilted by the tilting motor, the camera mobile device is constrained by the camera mobile device handheld grip such that the camera lens substantially overlaps an intersection of the rotating axis and the tilting axis throughout the rotating and/or tilting action.

In one or more embodiments, the rotating motor and/or tilting motor is activated by a user. In one or more embodiments, the rotating motor and/or tilting motor is automatically activated in response to a command signal from the camera mobile device.

In Step 416, a ready signal is exchanged between the camera mobile device handheld grip and the camera mobile device to synchronize image capture. In one or more embodiments, the camera mobile device handheld grip sends the ready signal to the camera mobile device to trigger the image capture. For example, the ready signal may be sent when the rotating shaft and/or the tilting shaft reach the particular rotating angle and/or tilting angle. In one or more embodiments, the ready signal specifies the particular rotating angle and/or tilting angle reached by the rotating shaft and/or the tilting shaft. In one or more embodiments, the camera mobile device sends the ready signal to the camera mobile device handheld grip to advance to next position. For example, the ready signal may be sent when the image capture is complete at the current position. In one or more embodiments, the ready signal specifies the next rotating angle and/or next tilting angle to be reached by the rotating shaft and/or the tilting shaft.

In Step 417, an image is captured using the camera lens of the camera mobile device. In one or more embodiments, the image is one in a sequence of images to generate a panorama. In one or more embodiments, the image is indexed with the particular rotation angle and tilting angle of the position where the camera mobile device captures the particular image.

In Step 418, a determination is made as to whether any more image remains to be captured. If the determination is positive, i.e., at least one more image remains to be captured, the method returns to Step 415. If the determination is negative, i.e., no more image remains to be captured, the method proceeds to Step 419.

In Step 419, a panorama is generated by stitching together the sequence of images captured through the iterations of Step 415 through Step 418. In one or more embodiments, the panorama is generated by the camera mobile device according to the rotation angle and tilting angle of each of the sequence of images. As noted above, the camera lens remains substantially overlapping the intersection of the rotating axis and the tilting axis throughout the sequence of images captured through the iterations of Step 415 through Step 418. Because the intersection of the rotating axis and the tilting axis is stationary independent of the rotating/tilting angles, the sequence of images are stitched together with reduced distortion to improve the quality of the panorama.

In one or more embodiments, a series of panoramas are generated at a series of time points and processed to generate a media file for virtual reality application.

FIGS. 11-14 show an example in accordance with one or more embodiments of the invention. The example shown in FIGS. 11-14 may be, for example, based on one or more components depicted in FIGS. 1-9 above and the method flowchart depicted in FIGS. 10A and 10B above. In one or more embodiments, one or more of the modules and elements shown in FIGS. 11-14 may be omitted, repeated, and/or substituted. Accordingly, embodiments of the invention should not be considered limited to the specific arrangements of modules shown in FIGS. 11-14.

Figures 11, 12:
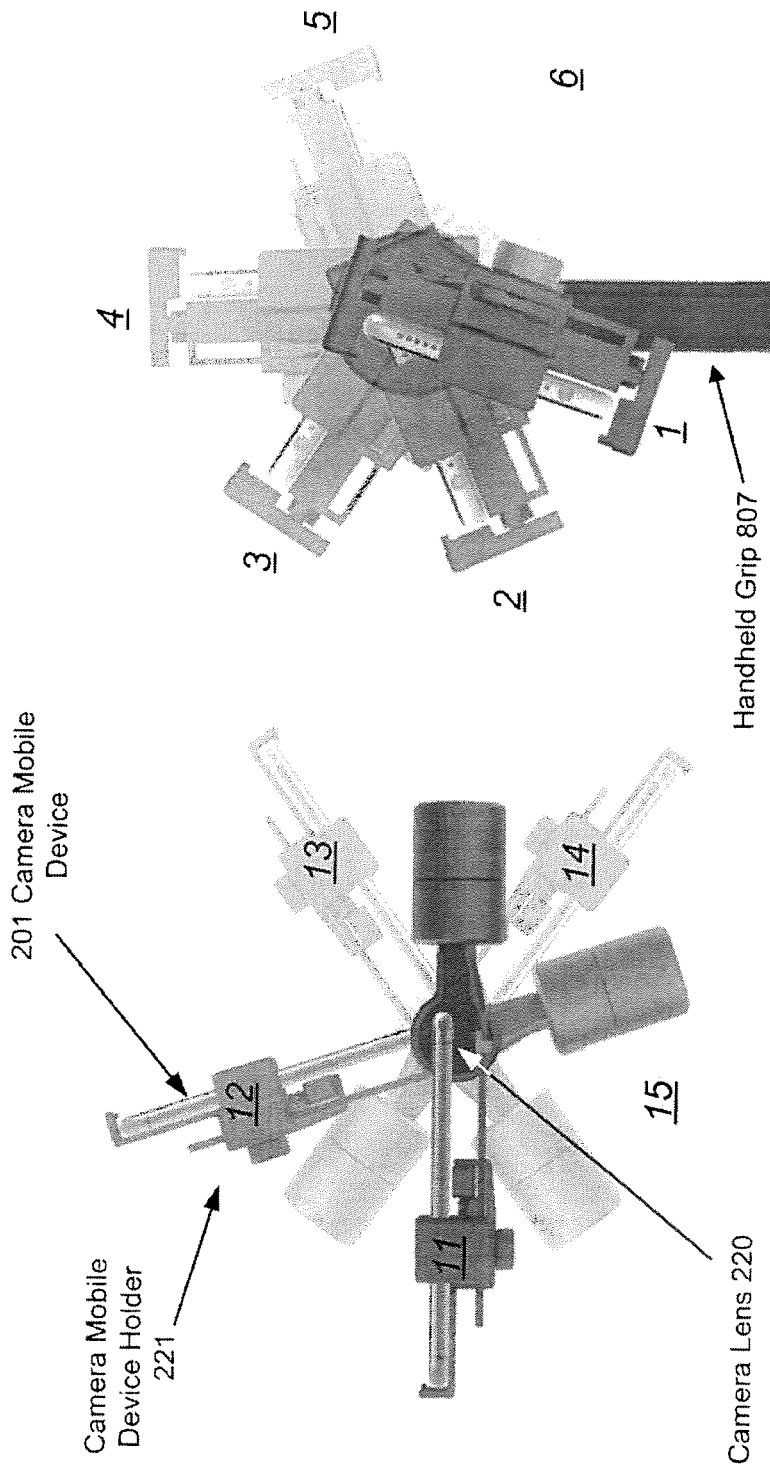
FIGS. 11, 12, 13, and 14 show various examples in accordance with one or more embodiments of the invention.

FIGS. 11 and 12 show a top view and a side view, respectively, corresponding to a sequence of image capture positions of the camera mobile device handheld grip described in reference to FIGS. 1 and 4-9 above. Each of the image capture positions is denoted by a corresponding numeral tagged to the camera device holder (221) holding the camera mobile device (201). At each of the image capture positions, an image is captured by camera mobile device (201) using the camera lens (220). Each image is indexed with a corresponding tilting angle and rotating angle.

Figure 13:
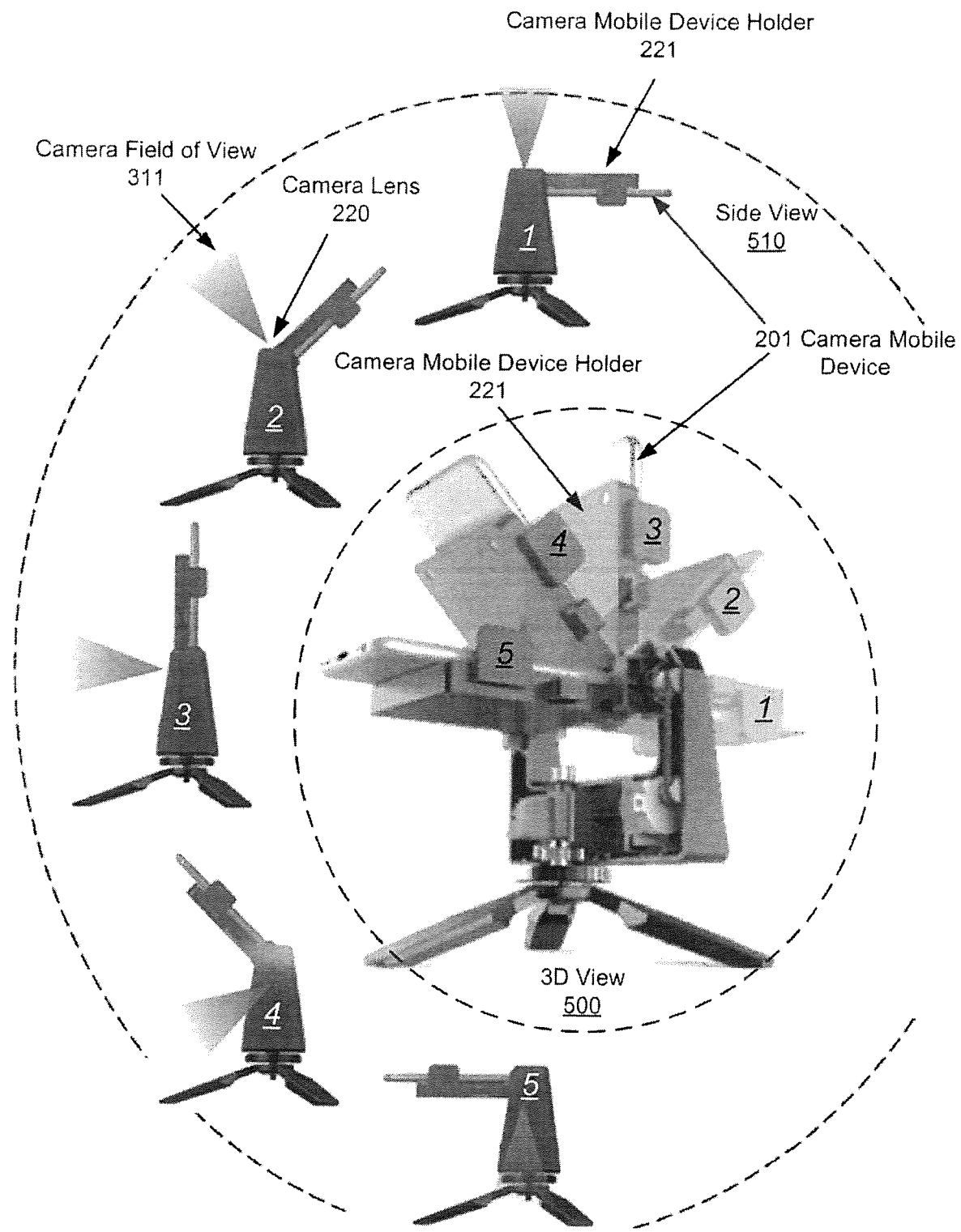

FIG. 13 shows a 3-dimensional (3D) view (500) corresponding to a sequence of image capture positions of a motorized camera mobile device stand described in reference to FIGS. 1-3 above. Each of the image capture positions is denoted by a corresponding numeral tagged to the camera device holder (221) holding the camera mobile device (201), as shown in the 3D view (500). Further, the side view (510) shows individual views of the image capture positions illustrating the corresponding camera field of view (311). Specifically, the camera field of view (311) is oriented according to a sequence of tilting angles described in reference to FIGS. 1-3 above. At each of the image capture positions, an image is captured by camera mobile device (201) using the camera lens (220). Each image is indexed with a corresponding tilting angle.

Figure 14:
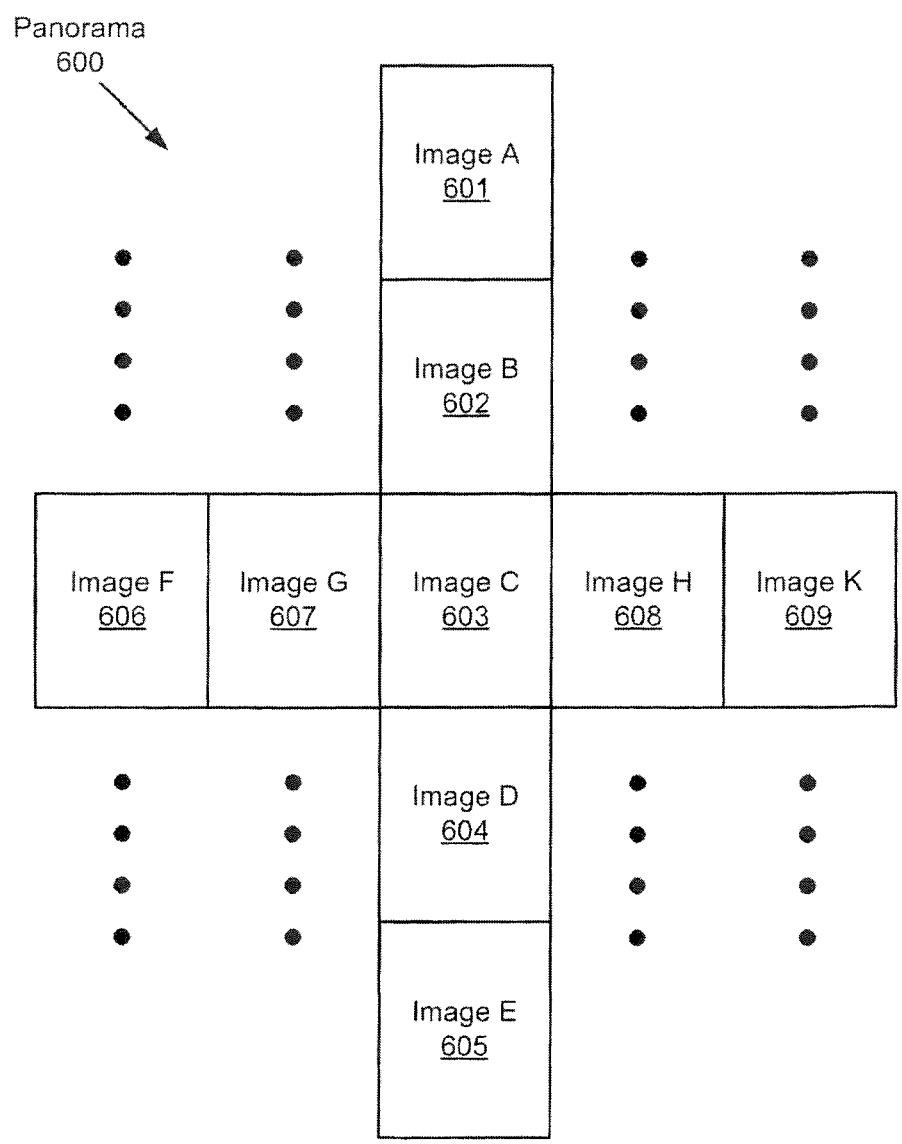

FIG. 14 shows a panorama (600) that is generated by stitching a matrix of images together. For example, the image A (601), image B (602), image C (603), image D (604), and image E (605) may correspond to the images captured at the image capture positions depicted in FIGS. 12 and/or 13 above. Specifically, each of the image A (601), image B (602), image C (603), image D (604), and image E (605) corresponds to one of the tilting angles depicted in FIGS. 12 and/or 13 above. In another example, the image F (606), image G (607), image C (603), image H (608), and image K (609) may correspond to rotation angles of a motorized tilt and swivel device, such as depicted in FIG. 11 above.

Figure 15A:
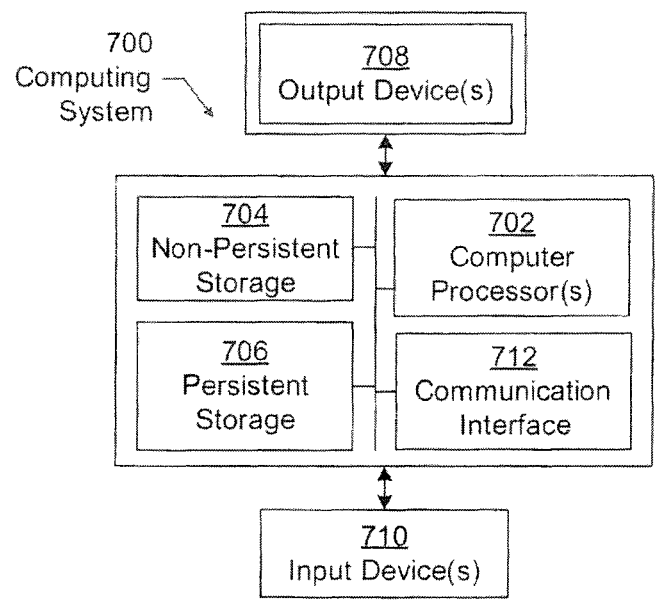
FIG. 15 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 15A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 15B:
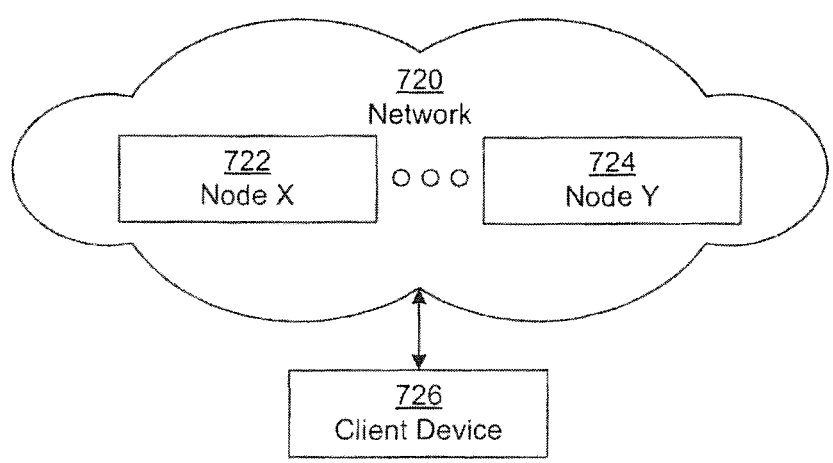

The computing system (700) in FIG. 15A may be connected to or be a part of a network. For example, as shown in FIG. 15B, the network (720) may include multiple nodes (e.g., node X (722), node Y (724)). Each node may correspond to a computing system, such as the computing system shown in FIG. 15A, or a group of nodes combined may correspond to the computing system shown in FIG. 15A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 15B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 15A. Further, the client device (726) may include and/or perform all or a portion of one or more embodiments of the invention.

The computing system or group of computing systems described in FIGS. 15A and 7B may include functionality to perform a variety of operations disclosed herein. For example, the computing system(s) may perform communication between processes on the same or different system. A variety of mechanisms, employing some faun of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 15A may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 15A and the nodes and/or client device in FIG. 15B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A motorized tilt and swivel device, comprising:
  a motorized component configured to:
    receive a command signal; and
    place, in response to the command signal, a camera mobile device in a plurality of positions for capturing a plurality of images,
    wherein the plurality of positions comprise a plurality of rotation angles with respect to a rotating axis and a plurality of tilting angles with respect to a tilting axis, wherein the rotating axis intersects the tilting axis; and
  an alignment component configured to:
    substantially align, prior to receiving the command signal and based on an alignment marker, the rotating axis with a camera lens of the camera mobile device;
    substantially align, prior to receiving the command signal and based on the alignment marker, the tilting axis with the camera lens; and
    constrain the camera mobile device such that the camera lens substantially overlaps an intersection of the rotating axis and the tilting axis in each of the plurality of positions.

2. The motorized tilt and swivel device of claim 1, the motorized component comprising:
  a rotating motor and a tilting motor;
  a rotating shaft coupled to the rotating motor, wherein the rotating shaft is rotatable by the rotating motor around the rotating axis;
  a tilting shaft coupled to the tilting motor, wherein the tilting shaft is rotatable by the tilting motor around the tilting axis, wherein the tilting motor is further coupled to the rotating shaft and rotatable with the rotating shaft around the rotating axis; and
  a controller configured to:
    activate, in response to the command signal, the rotating motor to rotate the rotating shaft through the plurality of rotation angles; and
    activate, in response to the command signal, the tilting motor to rotate the tilting shaft through the plurality of tilting angles.

3. The motorized tilt and swivel device of claim 2, the alignment component comprising:
  the alignment marker coupled to the tilting shaft and configured to:
    visibly mark, in an exposed position of the alignment marker, the intersection of the rotating axis and the tilting axis; and
    hide, in a retracted position of the alignment marker, from a field of view of the camera lens,
    wherein the alignment marker is switchable, in response to a user activation, between the exposed position and the retracted position; and
  a camera mobile device holder moveably coupled to the tilting shaft and configured to hold the camera mobile device in each of the plurality of positions, wherein the camera mobile device holder comprises an alignment lock configured to:
    unlock the camera mobile device holder to slide the camera mobile device along the tilting axis and the rotating axis to substantially align the camera lens and the alignment marker; and
    lock the camera mobile device holder to hold the camera mobile device in an aligned position.

4. The motorized tilt and swivel device of claim 3, the tilting shaft comprising:
  a non-flat top view angle configured to place a camera lens surface of the camera mobile device to be coplanar with the tilting axis, and
  a non-flat side view angle configured to place the camera mobile device holder within a pre-determined range of the tilting axis.

5. The motorized tilt and swivel device of claim 3, the camera mobile device holder further comprising:
  a first clamp and a second clamp that are configured to hold the camera mobile device in each of the plurality of positions, wherein unlocking the camera mobile device holder comprises:
    unlocking the first clamp to slide, with respect to the rotating axis, the camera mobile device along the tilting axis; and
    unlocking the second clamp to slide, with respect to the tilting axis, the camera mobile device along the rotating axis, and
  wherein locking the camera mobile device holder comprises:

locking the first clamp and the second clamp.

6. The motorized tilt and swivel device of claim 2, the controller further configured to:
    detect the camera mobile device in proximity to the motorized tilt and swivel device; and
    establish, in response to the detecting, a communication link with the camera mobile device; and
    use the communication link and in response to the rotating shaft reaching each of the plurality of rotation angles and the tilting shaft reaching each of the plurality of tilting angles, communicate with the camera mobile device to synchronize capturing the plurality of images and placing the camera mobile device in the plurality of positions.

7. The motorized tilt and swivel device of claim 1,
    wherein the command signal is received from at least one selected from a group consisting of the camera mobile device and an operating button of the motorized tilt and swivel device.

8. A method for generating a panorama, comprising:
    substantially aligning, based on an alignment marker of a motorized tilt and swivel device, a rotating axis of the motorized tilt and swivel device with a camera lens of a camera mobile device;
    substantially aligning, based on the alignment marker, a tilting axis of the motorized tilt and swivel device with the camera lens;
    receiving, by the motorized tilt and swivel device, a command signal;
    placing, by the motorized tilt and swivel device in response to the command signal, the camera mobile device in a plurality of positions for capturing a plurality of images of the panorama; and
    constraining, by the motorized tilt and swivel device, the camera mobile device such that the camera lens substantially overlaps an intersection of the rotating axis and the tilting axis in each of the plurality of positions,
    wherein the plurality of positions comprise a plurality of rotation angles with respect to the rotating axis and a plurality of tilting angles with respect to the tilting axis,
    wherein the rotating axis intersects the tilting axis.

9. The method of claim 8, further comprising:
    activating, in response to the command signal, a rotating motor of the motorized tilt and swivel device to rotate a rotating shaft through the plurality of rotation angles around the rotating axis; and
    activating, in response to the command signal, a tilting motor of the motorized tilt and swivel device to rotate a tilting shaft through the plurality of tilting angles around the tilting axis.

10. The method of claim 9, further comprising:
    receiving a first user activation to switch the alignment marker from a retracted position to an exposed position, wherein the alignment marker is coupled to the tilting shaft and visibly marks, in the exposed position, the intersection of the rotating axis and the tilting axis, wherein the alignment marker hides, in the retracted position, from a field of view of the camera lens;
    unlocking a camera mobile device holder of the motorized tilt and swivel device to slide the camera mobile device along the tilting axis and the rotating axis to substantially align the camera lens and the alignment marker; and
    locking the camera mobile device holder to hold the camera mobile device in an aligned position,
    wherein the camera mobile device holder is moveably coupled to the tilting shaft and configured to hold the camera mobile device in each of the plurality of positions.

11. The method of claim 10, further comprising:
    receiving a second user activation to switch the alignment marker from the exposed position to the retracted position,
    wherein the command signal is received subsequent to switching the alignment marker from the exposed position to the retracted position.

12. The method of claim 10, further comprising:
    placing, based on a non-flat top view angle of the tilting shaft, a camera lens surface of the camera mobile device to be coplanar with the tilting axis; and
    placing, based on a non-flat side view angle of the tilting shaft, the camera mobile device holder within a predetermined range of the tilting axis.

13. The method of claim 10, further comprising:
    holding the camera mobile device in each of the plurality of positions using a first clamp and a second clamp of the camera mobile device holder,
    wherein unlocking the camera mobile device holder comprises:
        unlocking the first clamp to slide, with respect to the rotating axis, the camera mobile device along the tilting axis; and
        unlocking the second clamp to slide, with respect to the tilting axis, the camera mobile device along the rotating axis, and
    wherein locking the camera mobile device holder comprises:
        locking the first clamp and the second clamp.

14. The method of claim 9, further comprising:
    detecting, by the motorized tilt and swivel device, the camera mobile device in proximity to the motorized tilt and swivel device;
    establishing, by the motorized tilt and swivel device and in response to the detecting, a communication link with the camera mobile device; and
    exchanging, using the communication link and in response to the rotating shaft reaching each of the plurality of rotation angles and the tilting shaft reaching each of the plurality of tilting angles, communication signals between the motorized tilt and swivel device and the camera mobile device to synchronize capturing the plurality of images and placing the camera mobile device in the plurality of positions.

15. The method of claim 8,
    wherein the command signal is received from at least one selected from a group consisting of the camera mobile device and an operating button of the motorized tilt and swivel device.

16. A non-transitory computer readable medium storing instructions for generating a panorama, the instructions, when executed by a computer processor, comprising functionality for:
    receiving, by a motorized tilt and swivel device, a motor command signal; and
    placing, by the motorized tilt and swivel device in response to the motor command signal, a camera mobile device in a plurality of positions for capturing a plurality of images of the panorama, wherein a rotating axis and a tilting axis of the motorized tilt and swivel device are substantially aligned, based on an alignment marker of the motorized tilt and swivel device, with a camera lens of a camera mobile device, wherein the camera mobile device is constrained, by the motorized tilt and swivel device, such that the camera lens substantially overlaps an intersection of the rotating axis and the tilting axis in each of the plurality of positions, wherein the plurality of positions comprise a plurality of rotation angles with respect to the rotating axis and a plurality of tilting angles with respect to the tilting axis, wherein the rotating axis intersects the tilting axis.

17. The non-transitory computer readable medium of claim 16, the instructions, when executed by the computer processor, further comprising functionality for:

activating, in response to the motor command signal, a rotating motor of the motorized tilt and swivel device to rotate a rotating shaft through the plurality of rotation angles around the rotating axis; and activating, in response to the motor command signal, a tilting motor of the motorized tilt and swivel device to rotate a tilting shaft through the plurality of tilting angles around the tilting axis.

18. The non-transitory computer readable medium of claim 16, the instructions, when executed by the computer processor, further comprising functionality for:

receiving, by the motorized tilt and swivel device, an alignment command signal prior to the motor command signal; and activating, in response to the alignment command signal, the alignment marker to facilitate aligning the rotating axis and the tilting axis with the camera lens.

19. The non-transitory computer readable medium of claim 16, the instructions, when executed by the computer processor, further comprising functionality for:

receiving, by the motorized tilt and swivel device, an alignment command signal prior to the motor command signal; and activating, in response to the alignment command signal, a camera flash to facilitate aligning the rotating axis and the tilting axis with the camera lens.

20. The non-transitory computer readable medium of claim 17, the instructions, when executed by the computer processor, further comprising functionality for:

detecting, by the motorized tilt and swivel device, the camera mobile device in proximity to the motorized tilt and swivel device;

establishing, by the motorized tilt and swivel device and in response to the detecting, a communication link with the camera mobile device; and exchanging, using the communication link and in response to the rotating shaft reaching each of the plurality of rotation angles and the tilting shaft reaching each of the plurality of tilting angles, communication signals between the motorized tilt and swivel device and the camera mobile device to synchronize capturing the plurality of images and placing the camera mobile device in the plurality of positions.

* * * * *